United States Patent
Benedict

(10) Patent No.: US 10,829,303 B2
(45) Date of Patent: Nov. 10, 2020

(54) GUIDE TRACK SYSTEMS FOR AUTOMATED MATERIAL HANDLING, SHIPPING, STORAGE AND PARKING FACILITIES

(71) Applicant: BEC COMPANIES, INC., Tallahassee, FL (US)

(72) Inventor: Charles E. Benedict, Tallahassee, FL (US)

(73) Assignee: BEC COMPANIES, INC., Tallahassee, FL (US)

( * ) Notice: Subject to any disclaimer, the term of this patent is extended or adjusted under 35 U.S.C. 154(b) by 252 days.

(21) Appl. No.: 16/176,944

(22) Filed: Oct. 31, 2018

(65) Prior Publication Data

US 2019/0062050 A1    Feb. 28, 2019

Related U.S. Application Data

(63) Continuation-in-part of application No. 16/036,494, filed on Jul. 16, 2018, now Pat. No. 10,723,553,
(Continued)

(51) Int. Cl.
*B65G 1/04* (2006.01)
*B65G 1/06* (2006.01)
(Continued)

(52) U.S. Cl.
CPC .............. *B65G 1/0464* (2013.01); *B61B 3/00* (2013.01); *B61B 3/02* (2013.01); *B65G 1/02* (2013.01);
(Continued)

(58) Field of Classification Search
CPC .... B65G 1/0464; B65G 1/0478; B65G 1/065; B63B 27/00; B61B 3/00; B61B 3/02
See application file for complete search history.

(56) References Cited

U.S. PATENT DOCUMENTS

| 1,889,112 A | 11/1932 | Shoemaker |
| 5,146,724 A | 9/1992 | Arthur |

(Continued)

FOREIGN PATENT DOCUMENTS

| CN | 101711210 A | 5/2010 |
| DE | 9203605.8 U1 | 9/1992 |
| JP | 6164980 | 4/1986 |

OTHER PUBLICATIONS

Simple connections, Steelconstruction.info, [online]. Aug. 13, 2014 (retrieved on Oct. 23, 2015]. Retrieved from the internet: http://webarchive.org/web/20140813071110/http://www.steelconstruction.info/Simple_connections.

(Continued)

*Primary Examiner* — Saul Rodriguez
*Assistant Examiner* — Ashley K Romano
(74) *Attorney, Agent, or Firm* — Dowell & Dowell, P.C.

(57) ABSTRACT

An overhead guide track system for automated material handling and storage facilities wherein at least one transfer unit is suspended from carriages that travel along the track system, and wherein the track system includes a plurality of first and second inverted "T" beams being assembled in an X-Y manner such that the first and second support beams intersect with one another in perpendicular relationship and wherein each of the first and second inverted "T" beams includes horizontal flanges connected to a central vertical web, and wherein at least one end of a plurality of the vertical webs of the first and second inverted "T" beams are connected to vertically oriented pedestals at a plurality of intersections of the first and second inverted "T" beams and which pedestals have transfer plates over which the carriages pass and through open gaps between the horizontal flanges at the intersections and the transfer plates.

27 Claims, 21 Drawing Sheets

Related U.S. Application Data which is a continuation of application No. 15/505,365, filed as application No. PCT/US2015/046533 on Aug. 24, 2015, now Pat. No. 10,023,384.

(60) Provisional application No. 62/040,883, filed on Aug. 22, 2014.

(51) Int. Cl.
   *B65G 1/02*   (2006.01)
   *B61B 3/00*   (2006.01)
   *B61B 3/02*   (2006.01)
   *B63B 27/00*  (2006.01)

(52) U.S. Cl.
   CPC .......... *B65G 1/0478* (2013.01); *B65G 1/065* (2013.01); *B63B 27/00* (2013.01)

(56) References Cited

U.S. PATENT DOCUMENTS

| | | |
|---|---|---|
| 5,289,665 A | 3/1994 | Higgins |
| 8,628,289 B1 | 1/2014 | Benedict |
| 2008/0213073 A1 | 9/2008 | Benedict |

OTHER PUBLICATIONS

Search report and written opinion for European application 15833308.8, dated Feb. 28, 2018.

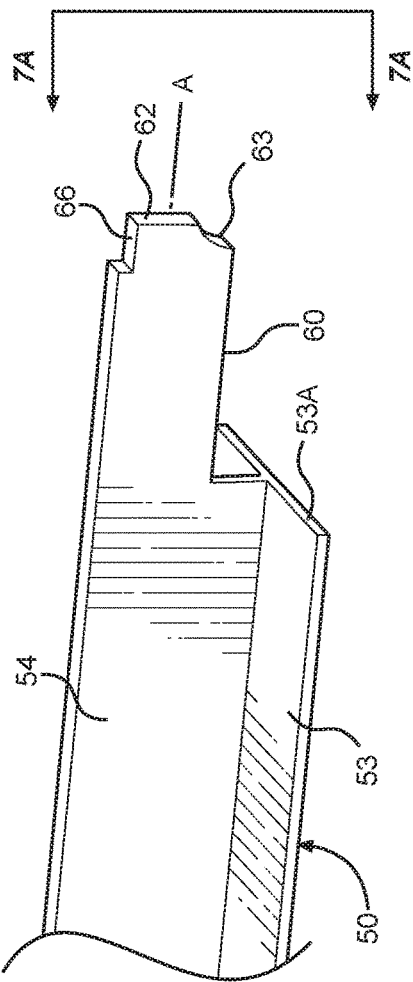
FIG. 6A
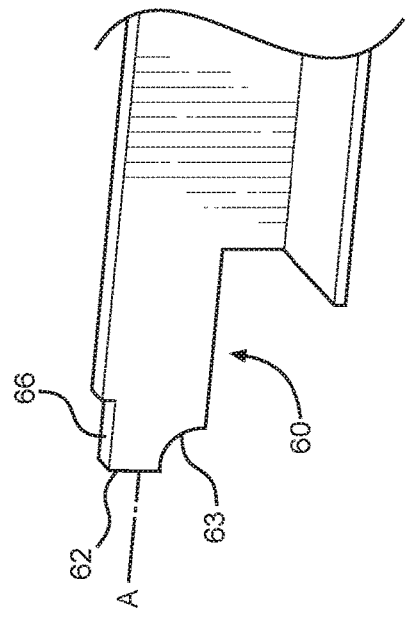
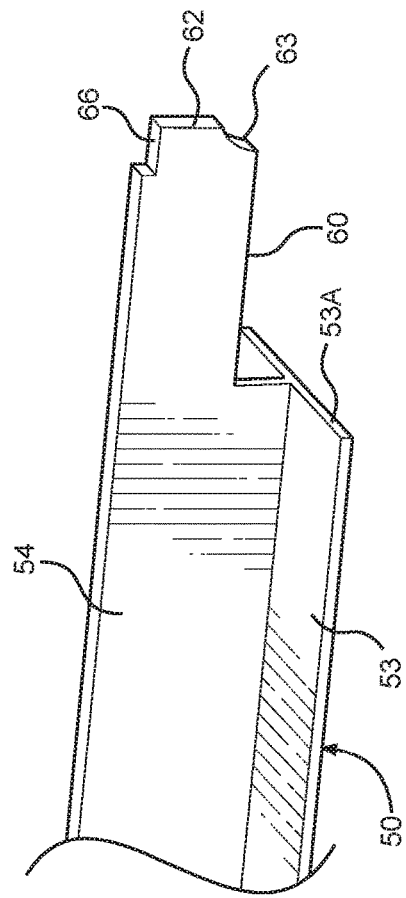
FIG. 6B
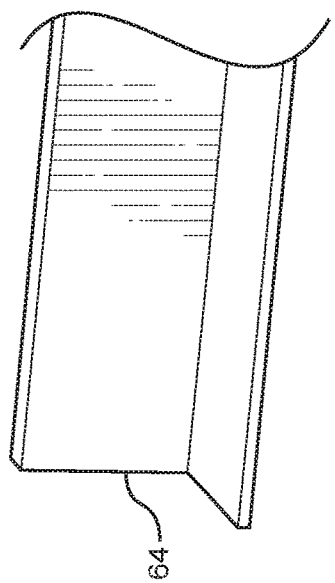

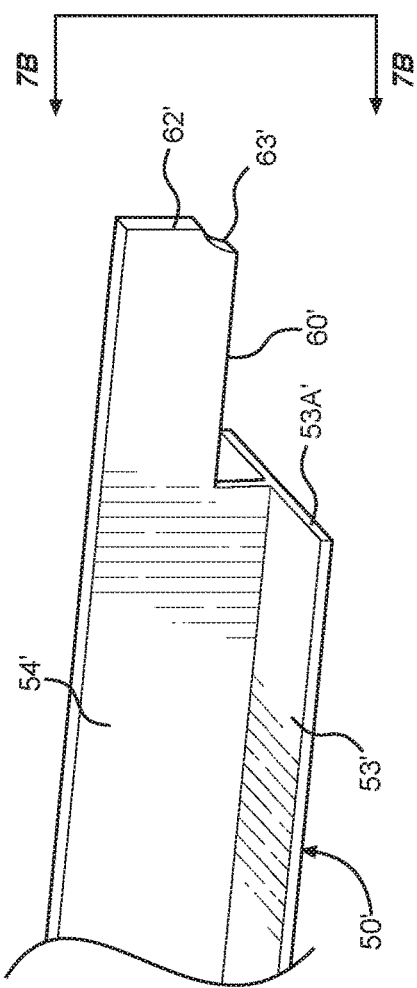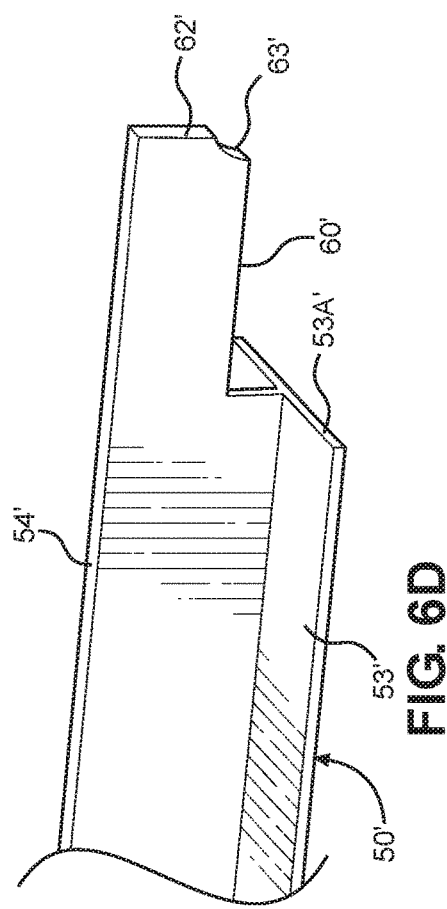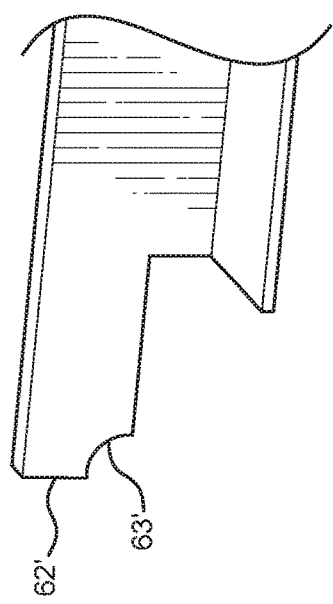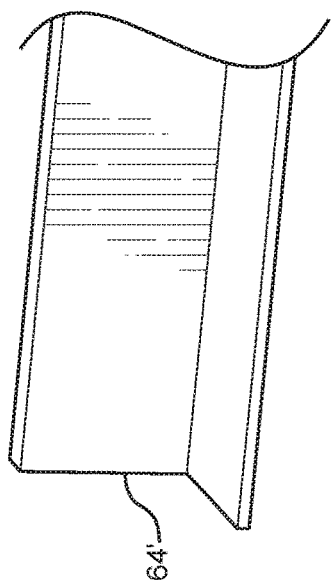

GUIDE TRACK SYSTEMS FOR AUTOMATED MATERIAL HANDLING, SHIPPING, STORAGE AND PARKING FACILITIES

BACKGROUND OF THE INVENTION

Field of the Invention

This invention is generally directed to automated multi-directional material handling systems which may be used to selectively retrieve and discharge containers, supplies, cargo, vehicles, armaments, storage bins and the like, within or without storage facilities, automated parking facilities, warehouses, vessels at sea and the like. The systems include cost effective and rigorous overhead intersecting inverted "T" beam tracks along which transfer units or vehicles are operated in transverse directions to move materials and articles to storage spaces or transfer such materials and articles from storage spaces to and between different modes of transportation associated with warehouses, supply yards, rail depots and/or port and other shipping facilities.

Brief Description of the Related Art

Overhead rail systems for supporting motorized and non-motorized vehicles or transfer units, for moving or transporting physical items or groups of items within warehouses, storage structures, vehicle parking or storage facilities, boat storage facilities, shipping or port handling and transfer facilities are known in the art. Such systems may include overhead open box beams such as described, by way of example, in U.S. Pat. Nos. 7,753,637, 7,850,412, 7,909,558, and 8,408,863 to Benedict et al., the entire contents of which are incorporated herein by reference.

Such overhead conveyor systems include load transfer or container carriers, commonly referred to as transfer units, or TUs, which are suspended from carriages that are supported within open box beams. The transfer units are suspended by shafts or yokes that extend through open channels or slots in lower surfaces of the hollow box beams. As described in the earlier US patents, one of the most efficient and economical manner of shipping goods over land and waterways is the use of standardized cargo or shipping containers. The containers are manufactured in standard sizes which are generally twenty to forty feet in length. The containers are specifically designed so that they may be loaded into the holds below the decks of ocean going vessels, stacked and stored openly or stored in land based warehouses and/or moved from the vessels or warehouses by use of either on-board or on-shore cranes which place the containers directly onto land transport vehicles such as railway cars and trucks. Conventional container ships, warehouses, open storage areas and the like include one or more holds or storage spaces which, in some structures, may be divided into a plurality of vertically tiered cells by vertical beams which act as guides for the corners of containers that are to be stacked one upon another within each cell. Typical vertical cells may retain as many as six to ten or more stacked containers. In other structures, the storage spaces may be more open such that containers may be stacked one upon another without the vertical guide beams.

The same type of vertical storage cell structures, with and without the vertical guides, may be used in other environments such as in cities for high density automated parking facilities for vehicles, at docking areas for high density storage of boats and for the general storage of any type of goods and materials in warehouses and other storage facilities wherein standardized containers may not be appropriate.

SUMMARY OF THE INVENTION

The present invention is directed to an automated material storage and retrieval handling system for use in manipulating and storing standardized and other types of cargo containers, support bins, trays, vehicle containers or supports and the like within vertically oriented cells of a ship, warehouse and other open or enclosed storage facility such as used for vehicles including cars, trucks and buses, boats and shipping vessels, and other products. Further, the systems include overhead grid track structures which are securely mounted above storage cells and loading and discharging areas and which define intersecting and generally perpendicularly oriented tracks or rails on which container transfer units travel. Each transfer unit is mounted by a plurality of carriages or roller assemblies which are supported by the tracks such that the transfer units are suspended from the overhead tracks and are moveable in an X-Y manner so as to be positioned to place or withdraw containers or other articles or items relative to the cells or other storage spaces.

The transfer units are conventionally powered by motors which power drive gears or wheel systems which are engageable with the grid tracks of the system. The drive motors have anti-backdrive features such that when they are not powered, the motors act as locks to prevent movement of the transfer units.

The systems of the invention are designed to provide a space above an upper tier of each vertical storage cell which is large enough for the transfer units to maneuver while suspending a hoist line, spreader beam or the like, there from, such that containers or other objects may be manipulated throughout the track system and moved from one cell area to another beneath the overhead track system but above the storage cells.

The systems of the invention also reduce the amount of effort and manual labor which is necessary to access storage containers, vehicles, supplies, components and the like and permit movement of multiple containers within an open area or an area below a deck or ceiling of a structure but above the cell structures such that the containers or other objects may be interchangeably manipulated from space to space or cell to cell.

A primary object of the present invention is to provide an automated material handling, retrieval and storage system for warehouses, parking and boat storage buildings, and container ships and the like which allows such structures to operate at an optimum capacity for a given area "foot print" such that a maximum number of articles or containers can be stored and/or retrieved from such storage system.

It is also an object of the present invention to provide material handling, retrieval and storage systems for standardized and other international and local cargo shipping containers which enable specific containers to be retrieved from any level of multi-tiered vertical cell structures and maneuvered throughout the structures in X-Y paths such that a plurality of transfer units may simultaneously operate within a given system.

It is yet a further object of the present invention to provide an overhead grid track system for supporting motorized and non-motorized load transfer units which are provided with load elevating and lowering systems, such as spreader beam-like structures, hoists, winches and other lifts which are suspended from crane or cable devices and wherein generally perpendicularly intersecting tracks of the system are formed of steel inverted "T" beams which are joined by welding, and sometimes bolted or otherwise attached to one another, to form the intersecting tracks upon which the transfer units travel.

It is another object of the present invention to provide a structural grid track or rail structure which is economically constructed from steel inverted "T" beam structures in an X-Y grid system and by providing load transfer units that are capable of moving across open intersections formed at each area where X and Y inverted "T" beams intersect with one another.

It is another object of the present invention to reduce the costs associated with the construction and maintenance of overhead grid track systems by using more economical, lighter weight steel inverted "T" beams to form X-Y grids upon which transfer vehicles may be moved and wherein the inverted "T" beams provide greater strength and less deflection and less fatigue problems when compared to more conventional hollow box beam structures by use of replaceable reinforcement wear plates or hardened rails secured on existing horizontal flanges of the inverted "T" beams of the grid track systems.

An additional object of the invention is to facilitate combining the grid track system into and part of an actual support structure so that the entire hollow grid tracks of the prior art system are eliminated which dramatically reduces the overall weight and thereby reduce the cost of the grid track system.

It is also an object of the invention to facilitate the maintenance of carriages that support transfer units from overhead grid track systems by allowing immediate access to the carriages and components thereof such as motors, bearings, rollers, spherical supports, as well as allowing open inspection of the members of the grid track system and carriages to detect and prevent damage and possible failure of the grid track structure and carriages over time.

BRIEF DESCRIPTION OF THE DRAWINGS

A better understanding of the invention will be had with reference to the accompanying drawings.

FIG. 6A is a partial perspective view of a first embodiment of one of the inverted "T" beams of the present invention having both ends of the beam modified to form intersections of an overhead grid track system of the invention. The inverted "T" beam includes pairs of oppositely oriented horizontal flanges which form carriage support tracks or surfaces on opposite sides of a central vertical web of the beam. The vertical web of the inverted "T" beam is configured to terminate at an intersection of the grid track system and includes projecting opposite end portions that extend from the horizontal flanges relative to an elongated axis A-A of the beam.

FIG. 6B is a partial perspective view of a variation of the inverted "T" beam embodiment of FIG. 6A having only one end of the beam modified to form an intersection of the overhead grid track system of the present invention such that the modified end of the central web extends outwardly beyond the pair of oppositely oriented horizontal flanges which form the carriage support tracks on opposite sides of the vertical web.

FIG. 6C is a view similar to FIG. 6A wherein the upper surface of the vertical web of the inverted "T" beam is generally planar.

FIG. 6D is a view similar to FIG. 6B wherein the upper surface of the vertical web of the inverted "T" beam is generally planar.

DESCRIPTION OF THE PREFERRED EMBODIMENTS

Figure 1:
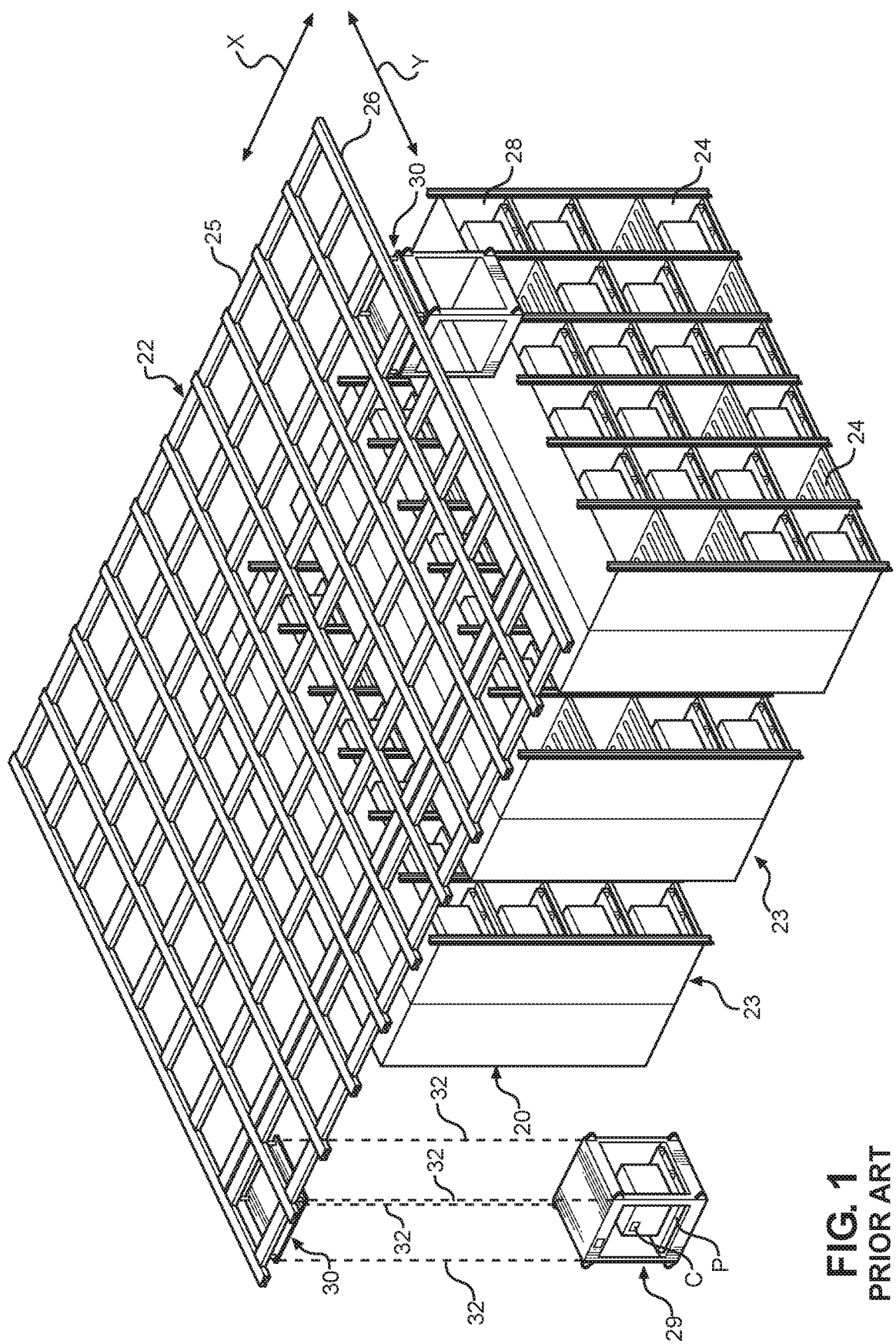
FIG. 1 is a top perspective view of a prior art overhead grid track system shown mounted above a plurality of vertically oriented storage cells which are horizontally open toward isles between spaced rows of the storage cells and wherein one or more transfer units are mounted to travel along intersecting open box beams above the isles and wherein the transfer units raise and lower carriers or elevators supporting goods to be placed into and/or removed from the storage cells.

With specific reference to FIG. 1 of the drawing figures, the system of the present invention will be described in association with, or use with, a storage warehouse or building 20 of the prior art. It should be noted that the system may be used in other environments such as self-storage warehouses, distribution warehouses, garages, boat storage facilities, port container terminals, on board ships and the like. The building 20 is divided into a plurality of rows 23 of vertically tiered cells 24. The cells are defined by vertically and horizontally extending steel beams. In this embodiment, the cells are open horizontally, such as at 28, to receive goods or containers "C" supported on pallets "P" which are carried by elevating devices, such as elevators and the like 29, connected by cables 32 to load transfer vehicles or units 30 that are movably linearly in X and Y directions along an overhead grid track system 22 formed of hollow open box beams as taught in the prior art. The grid includes open box beams 25 extending in an X direction and intersecting open box beams 26 extending in a Y direction. Because of the open grid system, a plurality of transfer units 30 may simultaneously operate within the system, see for example the two modified transfer vehicles or units shown at 40 of FIG. 2, although only a single transfer unit 30 is shown in FIG. 1

Figure 2:
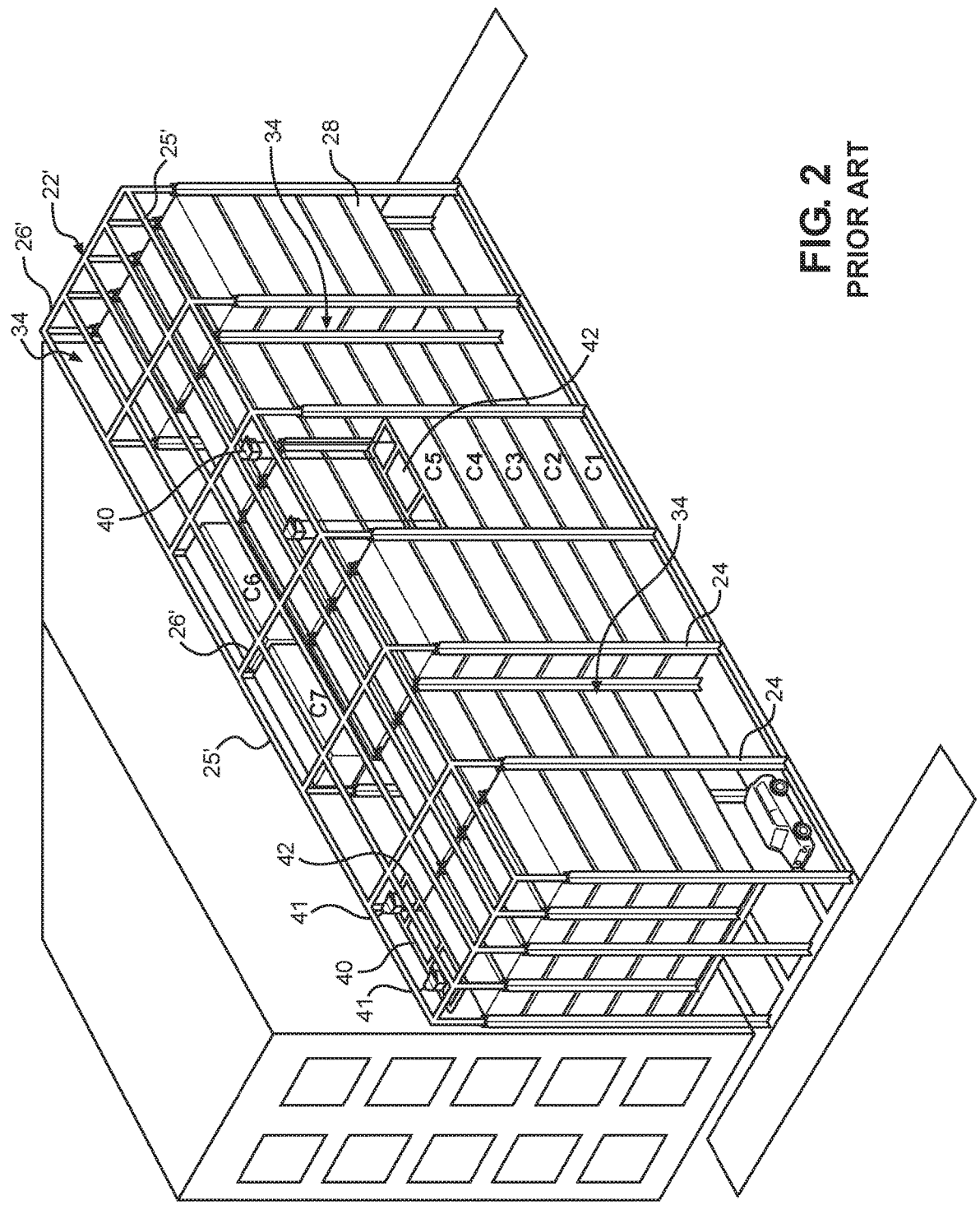
FIG. 2 is a top perspective view of another prior art overhead open box beam grid track system, similar to FIG. 1, shown mounted above a plurality of vertically oriented storage cells that are open vertically to receive containers, pallets and other enclosures for storing goods and products and wherein one or more transfer units are mounted to travel along intersecting open box beams and wherein the transfer units raise and lower containers retaining goods to be placed into and/or removed from the storage cells.

With reference to FIG. 2, the storage and transfer system of the present invention may also be used with a slightly different prior art overhead grid track system 22' which operates above a plurality of vertically open storage cells 34, as opposed to the horizontally open cells of FIG. 1. A plurality of containers "C1-C7" may be stacked one upon another in each of the vertical cells with the cells in closely spaced side-by-side relationship to maximize the storage capacity of a building, vessel, an open storage area, such as a port container terminal, or the like. As with the system of FIG. 1, the containers are transported along the overhead grid track system 22' formed of intersecting X and Y oriented hollow open box beams 25' and 26', which are similar to those described with respect to the embodiment of FIG. 1, by load transfer vehicles or units 40. In this embodiment, the units 40 may be of a size to allow conventional and standardized cargo or international shipping containers "C1-C7" to be transferred into and from each cell. In some instances, the cells will be dimensioned to accommodate other sizes of items to be stored or temporarily housed, such as trays and the like upon which vehicles or boats may be supported, as, for example, in high density automotive vehicle parking garages and boat storage facilities. The grid track system 22', which is used to support the movable transfer units 40, is provided above the cells and is spaced above the top of the cells a distance sufficient to allow passage of the transfer units 40 and any object supported thereby to move over the cells. Each transfer unit includes hoists 41 for raising and lowering a container engagement structure, such as a conventional spreader beam 42 that supports one of the containers "C1-C7" as it is lowered or raised relative to the cells 34.

Figure 3:
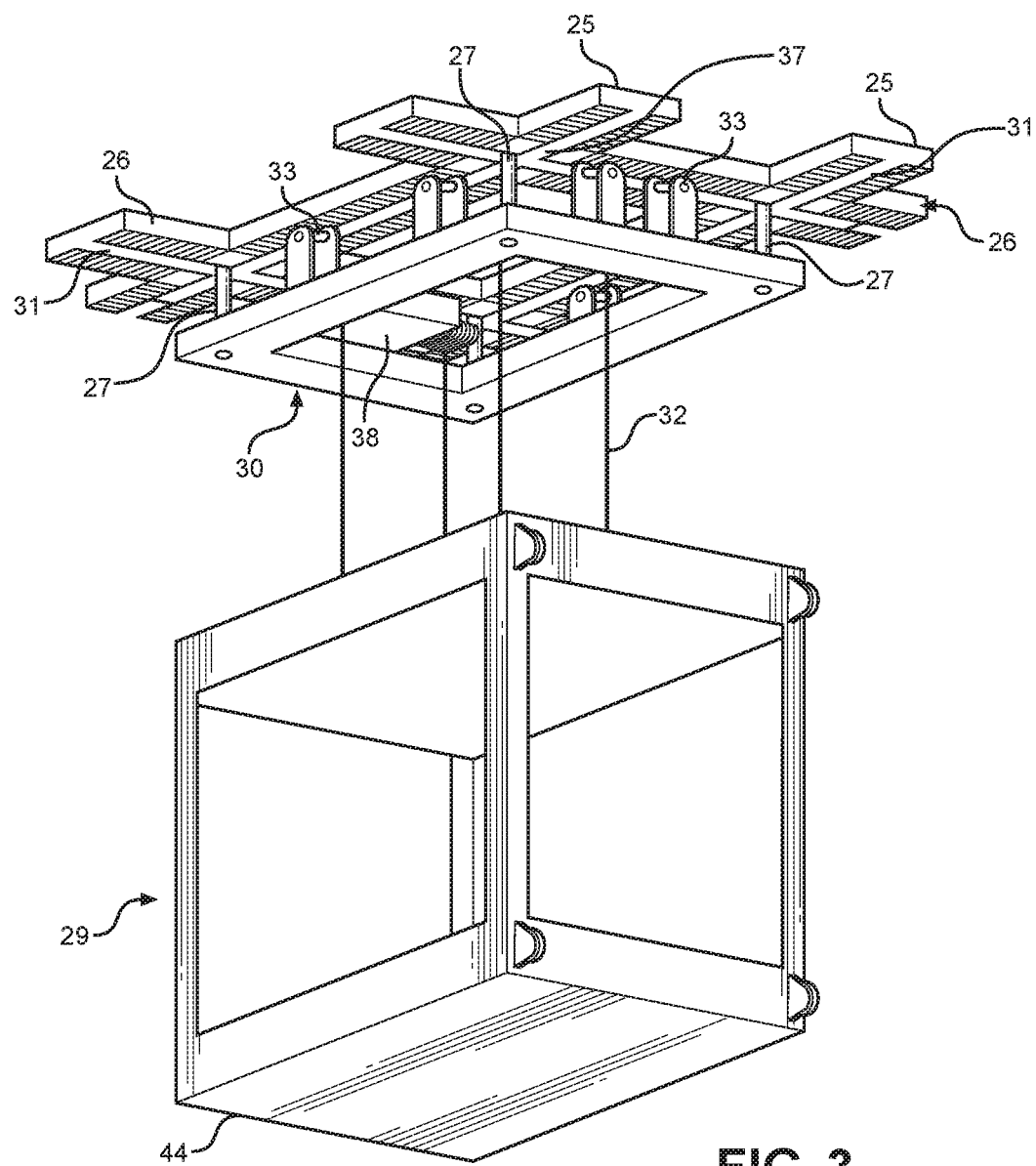
FIG. 3 is an enlarged perspective view of the prior art transfer unit shown in FIG. 1 suspended from pins extending through central slots from four carriages mounted within the open box beams of the overhead grid track system.

With reference to FIG. 3, a transfer unit or vehicle 30, similar to the one shown in FIG. 1, is suspended from pairs of parallel and intersecting box beams 25 or 26 by pins or spindles 27 extending through open slots 31 in the lower surfaces of the box beams 25 and 26. The spindles are mounted to carriages 35, see FIGS. 4 and 5, which are movable within the box beams. Generally, four carriages are connected to each transfer unit 30 such that the transfer unit is supported on two adjacent X beams 25 or two adjacent Y beams 26 which are oriented so as to intersect with one another in generally perpendicular relationship at open intersections 37. Each transfer unit 30, see FIG. 3, includes hoists 38, for controlling the cables 32 that are used to raise and lower pallets or objects carried on the elevators 29 that are to be aligned with the cells 24 in order to transfer articles or objects to and from the transfer units and the cells.

The transfer units or vehicles 40 of FIG. 2 are suspended from pairs of parallel and adjacent open box beams 25' and 26' of the overhead grid track system by pins or spindles extending through open slots in the lower surfaces of the box beams similar to the spindles 27 and the slots 31 shown in FIG. 3. The spindles are mounted to carriages 35, see FIGS. 4 and 5, which are movable within the box beams. The transfer units 40 include drive gears or wheels 33, see FIG. 3, driven by on-board motors to move the units along the box beams.

Figure 4:
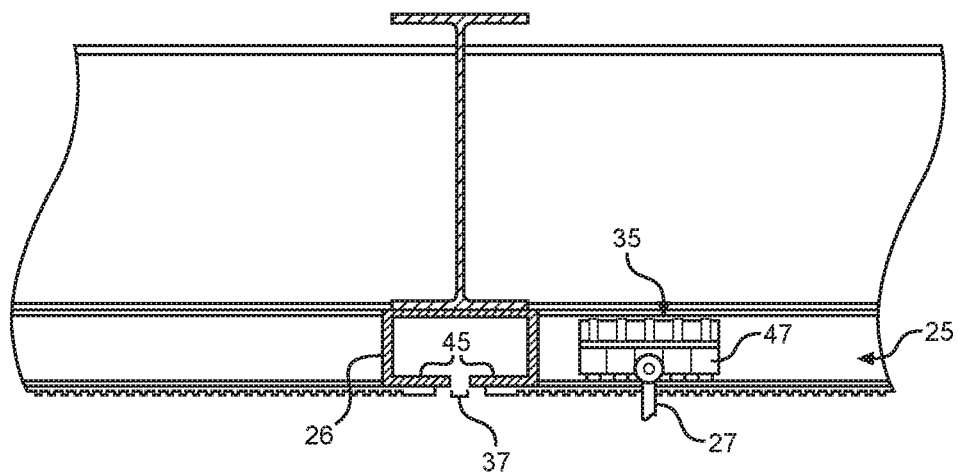
FIG. 4 is a cross sectional view through two intersecting open box beams of the overhead grid track system shown in FIG. 3 and showing a prior art support carriage mounted within one of the intersecting open box beams and further showing slots in the intersecting open box beams of the grid track system.
Figure 5:
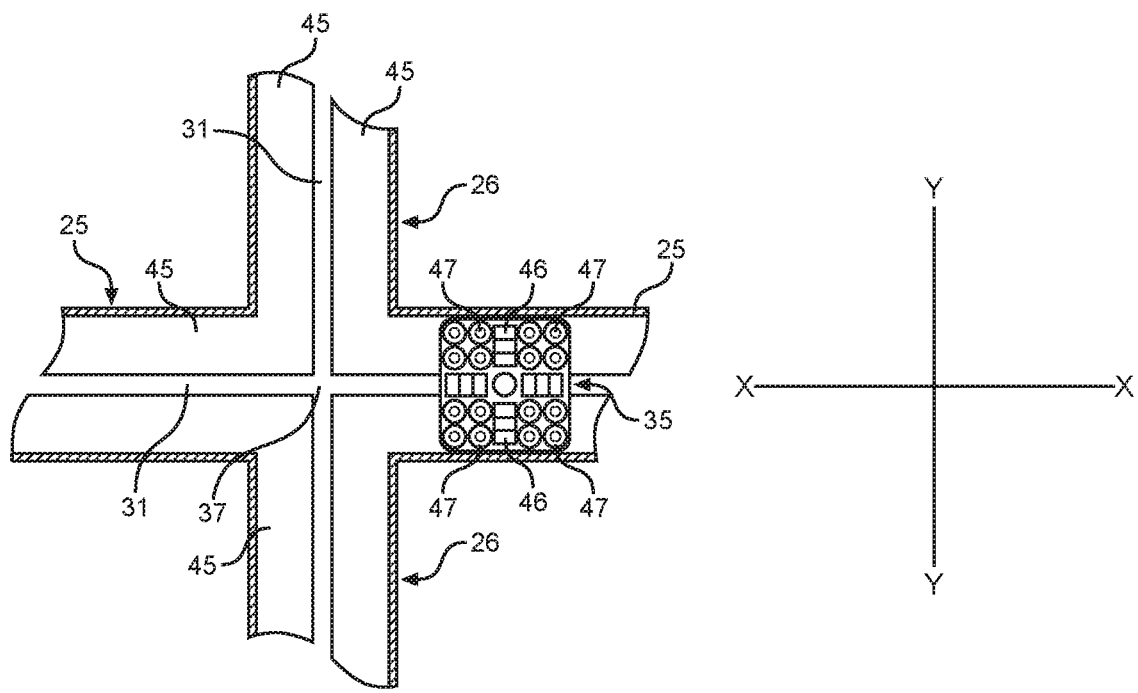
FIG. 5 is a top cross sectional view showing the prior art carriage of FIG. 4 mounted within an open box beam of the prior art grid track system.

With specific reference to FIGS. 4 and 5, a portion of a conventional hollow box grid track system is shown. The grid track system includes intersection X and Y of the open box beams forming guide tracks 25 and 26, respectively. The at least one movable transfer unit 30, or 40, is mounted to move in an X-Y motion along the track system and is supported by carriages 35 that move along upper surfaces of lower horizontal flanges 45 of the box beams by bi-directional rollers 46 and spherical rollers 47.

As previously described, in accordance with the teachings of the invention, many transfer units may operate within the grid track system of the present invention thereby enabling containers to be shuffled simultaneously within the open areas defined above the upper tier level of the vertical cells within a building or other structure or outside of such building or other structure.

The system of the present invention may be fully automated and interfaced with an inventory control system so that each transfer unit is directed to a given cell and to a given container location within the storage area by multiplexing a command signal from the inventory control system through a power raceway grid wiring or by remote control. Utilizing such a system, a designated container may be automatically located and containers above the designated container may be moved appropriately and, thereafter, relocated once the designated container has been retrieved utilizing the transfer units and their hoist mechanisms.

As previously noted, problems exist in open box beam overhead grid track systems for supporting transfer vehicles, such as 30 and 40, relative to the storage cells and loading and off-loading areas as shown in FIGS. 1-5. First, the open box beams are costly to form and are difficult to inspect to insure that the open box beams are not fatigued or cracked which can result in a break down in the storage system. Often cracks or defects occur within the box structures and thus are not readily evident to technicians, mechanics or inspectors. Also in order to maintain the support carriages 35 within the box beams, the carriages must be removed which considerably increases maintenance expenses.

With particular reference to FIGS. 6A-13, the specifics of several embodiments of the overhead grid track system of the present invention will be described in detail. Unlike the prior art overhead grid track structures shown in FIGS. 1-5 which use open hollow box beams to form the grid track system, with the present invention, the grid track system is formed of steel inverted "T" beams that are connected to one another in intersecting X-Y patterns. In this respect, with particular reference to FIGS. 6A, 6B, 6C, 6D and 7A, 7B, two varied and preferred embodiments of inverted "T" beams of the invention are shown. Each inverted "T" beam 50 and 50' includes horizontal flanges 53 and 53' that extend outwardly at right angles from and on opposite sides of a central vertical web 54 and 54' of FIGS. 6A, B, C and D. Carriages for supporting the transfer units, such as 30 or 40 that may be used with the invention, are designed to be supported on the upper surfaces of the flanges 53 and 53' of the inverted "T" beams 50 or 50' on opposite sides of the vertical webs 54 and 54' of FIGS. 6A, 6B, 6C and 6D. The carriages will be described in greater detail with respect to FIGS. 9A, 9B, and 10.

Figure 10:
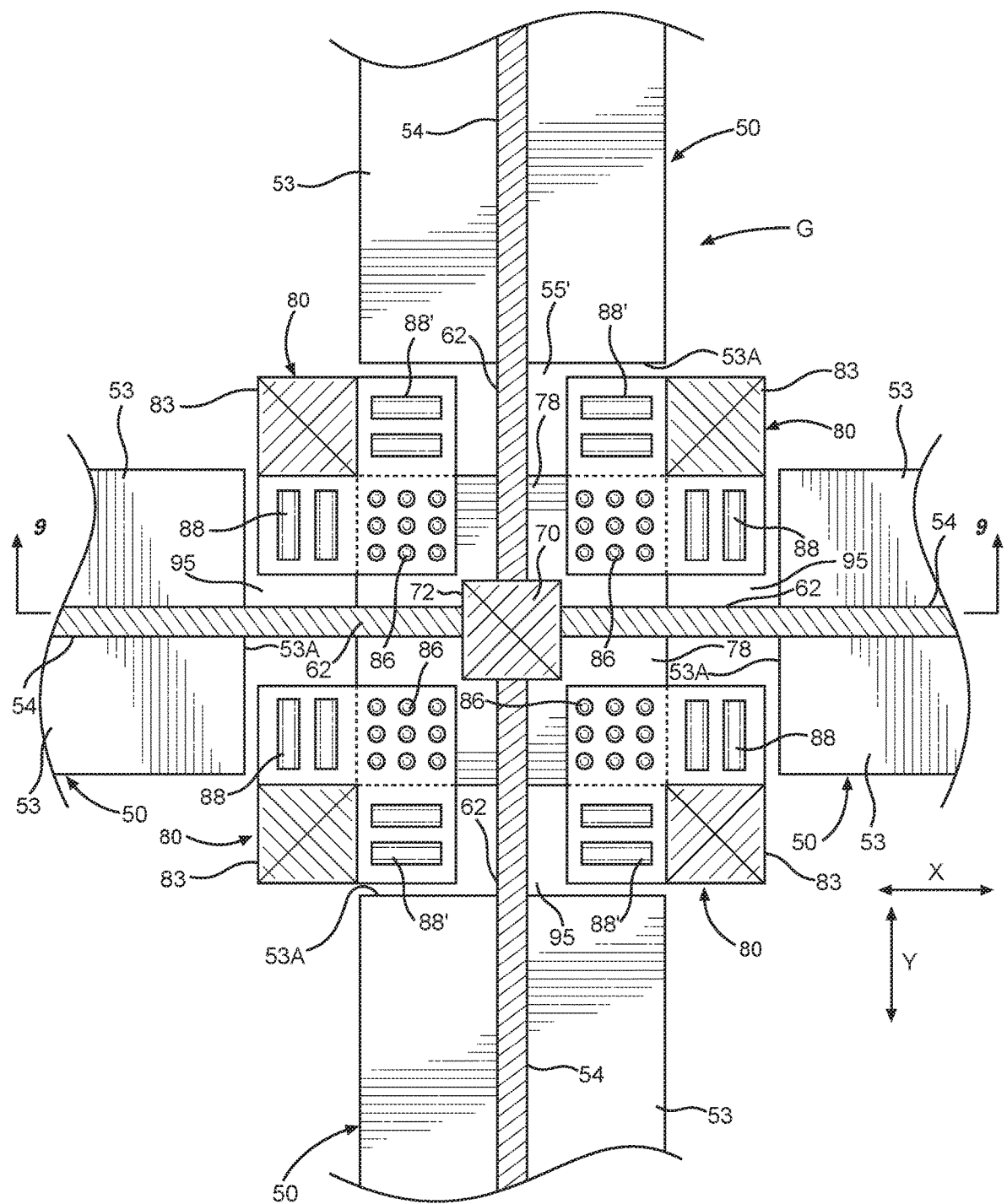
FIG. 10 is a cross sectional view taken along line 10-10 of FIGS. 9A and 9B showing the spherical and bidirectional rollers for supporting a carriage on the upper surfaces of the horizontal flanges of the inverted "T" beams forming the overhead grid track structure of the invention.

The use of horizontally flanged inverted "T" beams to form an overhead grid track structure "G", see FIG. 10, enhances a mechanic's accessibility to carriages 80 associated with each transfer unit, such as 30 or 40, and thus makes maintenance and repair of the carriages much easier and more efficient and less costly than is possible using the enclosed hollow box beam structures of the prior art. Also, the use of horizontally flanged inverted "T" beams reduces the costs associated with the construction and maintenance of the overhead grid track systems by using more economical and light weight steel beams to form the X-Y grids upon which the transfer units or vehicles travel. The horizontally flanged inverted "T" beams provide greater strength and less deflection while exhibiting fewer fatigue problems when compared to more conventional hollow box beams used in the prior art discussed above. By having the beam structures open for readily viewable inspection, any cracking or indications of failure or fatigue of the inverted "T" beams may be quickly determined so that corrective action or repair can be taken before a complete failure of a beam, thus resulting in a safer and more reliable track system for supporting the transfer units or vehicles that will be used with the grid track systems of the present invention.

To permit passage of the carriages 80 which support the transfer units or vehicles that travel along the inverted "T" beams of the invention, the structure of the inverted "T" beams 50 and 50' must be altered. In each embodiment, see FIGS. 6A-6D, a lower cut-out portion 60 and 60' is provided in at least one end of each inverted "T" beam such that each of the horizontal flanges 53 and 53' includes a leading edge 53A and 53A' that terminates short of a projecting end 62 and 62' of at least one upper end portion of the vertical web 54 and 54'.

The inverted "T" beam 50 of FIG. 6A, includes a pair of oppositely oriented horizontal flanges 53 which form carriage support tracks or surfaces on opposite sides of the vertical web 54 of the beam. The vertical web of the beam is configured to terminate at an intersection of the grid track system and includes projecting opposite end portions 62 that extend from the front and rear edges 53A of the horizontal flanges relative to an elongated axis A-A of the beam. The projecting portions are configured to be cooperatively seated on, and are secured to, support pedestals 70, see FIGS. 8B and 8C, that are suspended from overhead trusses or structural members "S", see FIGS. 9A and 9B, of a building, ship or other structure in which the grid track systems of the present invention are erected.

The oppositely projecting end portions 62 of the inverted "T" beam 50 of FIG. 6A are notched at 60 relative to the front and rear edges 53A of the horizontal flanges 53. The notches or open areas 60 of the vertical web 54 are provided to allow clearance for passage of the carriages 80 relative to the support pedestals 70. Further, when the beams are connected in assembled relationship in an X-Y pattern, the notches or open areas 60 will be provided in both the X and Y directions such that the carriages may move linearly along the inverted "T" beams 50 at all intersections 59 thereof.

To securely connect the intersecting inverted "T" beams 50 to one another in the desired X-Y grid pattern, the web 54 of each beam must be at least secured to the web 54 of the other intersecting beams. In the embodiment shown in FIG. 6A, the opposite ends 62 of each central vertical web also include a concavely shaped, or notched, lower free end portion 63 for purposes of facilitating seating of the inverted "T" beam against supporting convexly arcuate support shoulders 74 of the support pedestals 70, see FIGS. 8A and 8B. The vertical webs 54 of each X and Y oriented inverted "T" beam 50 will be welded to the support pedestals. The pedestals are configured to be secured, such as by welding or bolts and the like, to the overhead structural components "S" of open or closed storage areas, buildings, ships and the like in which the systems of the present invention are installed, see FIGS. 9A and 9B. In this embodiment, one or both ends of the upper surface of the vertical web 54 have notches 66 formed therein to receive arms 77 of mounting plates 76 of the support pedestals 70 as will be described hereinafter.

In the embodiment of the invention shown in FIG. 6B, only one projecting end portion 62 of the beam is notched at 63 and 66. The notched projecting end portion is to be supported by a support pedestal 70 at each intersection 59 of the X-Y grid system. The opposite end 64 of the inverted "T" beam 50 is configured having the same cross section as the remaining portion of the beam where there is no notched or open web area 60. Thus, the end 64 of the beam may be joined to a similar end of another beam by conventional welding or bolting. This structure allows the direct linking of a line of beams that are not to be connected to the support pedestals 70. Although not shown in the drawings, some of the inverted "T" beams may have both ends formed as shown at 64 in FIG. 6B.

The embodiment of inverted "T" beam 50' shown in FIG. 6C is similar to the embodiment of beam 50 shown in FIG. 6A wherein both of the opposite ends of the beam include projecting portions 62' and are notched out or open at 60' relative to the leading edges 53A' of the flanges 53'. The opposite projecting end portions 62' of the vertical web also include a concavely shaped, or notched, lower free end portion 63' for purposes of facilitating seating of the inverted "T" beam 50' against supporting convexly arcuate support shoulders 74 of the support pedestals 70, see FIGS. 8B and 8C. The vertical webs 54' of each X and Y oriented inverted "T" beam 50' will be welded to the support pedestals. The pedestals are configured to be secured, such as by welding or bolts and the like, to the overhead structural components "S" of open or closed storage areas, buildings or ships in which the systems of the present invention are installed, see FIGS. 9A and 9B. In the embodiment in FIG. 9B, the upper surface of the projecting end portion 62 of the vertical web is planar and thus not notched as is shown and described at 66 in the embodiment shown in FIGS. 6A and 6B The embodiment of the invention shown in FIG. 6D is similar to the inverted "T" beam 50 of FIG. 6B wherein one end 64' of the beam is not to be supported at an intersection of an X-Y grid, such that only one end of each of the inverted "T" beams 50' is configured to form a projecting end portion 62' having a concavely notched or configured lower free end portion 63' for facilitating seating of the inverted "T" beam against the convexly arcuate support shoulders 74 of one of the support pedestals 70. The opposite end 64' of the beam being the same in cross section as the remaining portion of the beam where there is no notched area 63' or open web area 60'. Thus, the end 64' of the beam may be joined to a similar end of another beam by conventional welding or bolting. Again, although not shown in the drawings, some of the inverted "T" beams 50' may have both ends formed as shown at 64' in FIG. 6D.

Figure 7A:
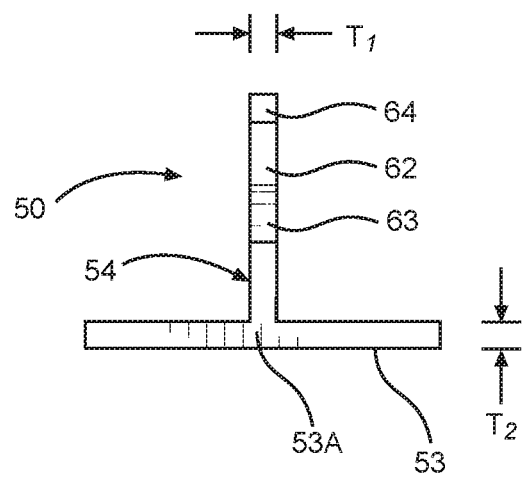
FIG. 7A is an end view of the inverted "T" beam of FIG. 6A taken along line 7A-7A of FIG. 6A.
Figure 7B:
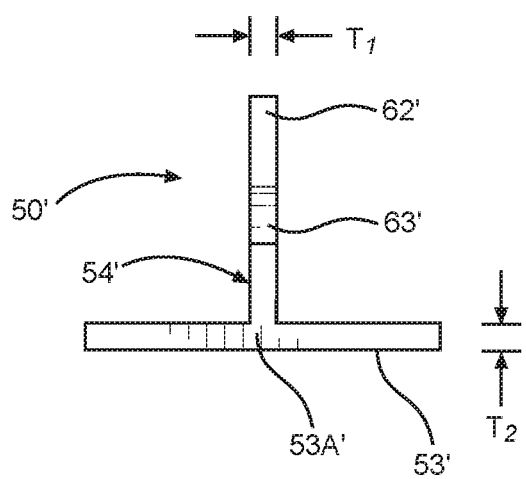
FIG. 7B is an end view of the inverted "T" beam of FIG. 6C taken along line 7B-7B.

With reference to FIGS. 7A and 7B, the inverted "T" beams 50, 50' of the invention may have web dimensions $T_1$ and flange dimensions $T_2$ that will vary depending upon anticipated load capacities of the operating systems. Further, as shown in FIGS. 6A and 6B, a vertical height dimension of the vertical webs 54, 54' and horizontal width dimension of the flanges 53, 53' may also vary.

Figure 9A:
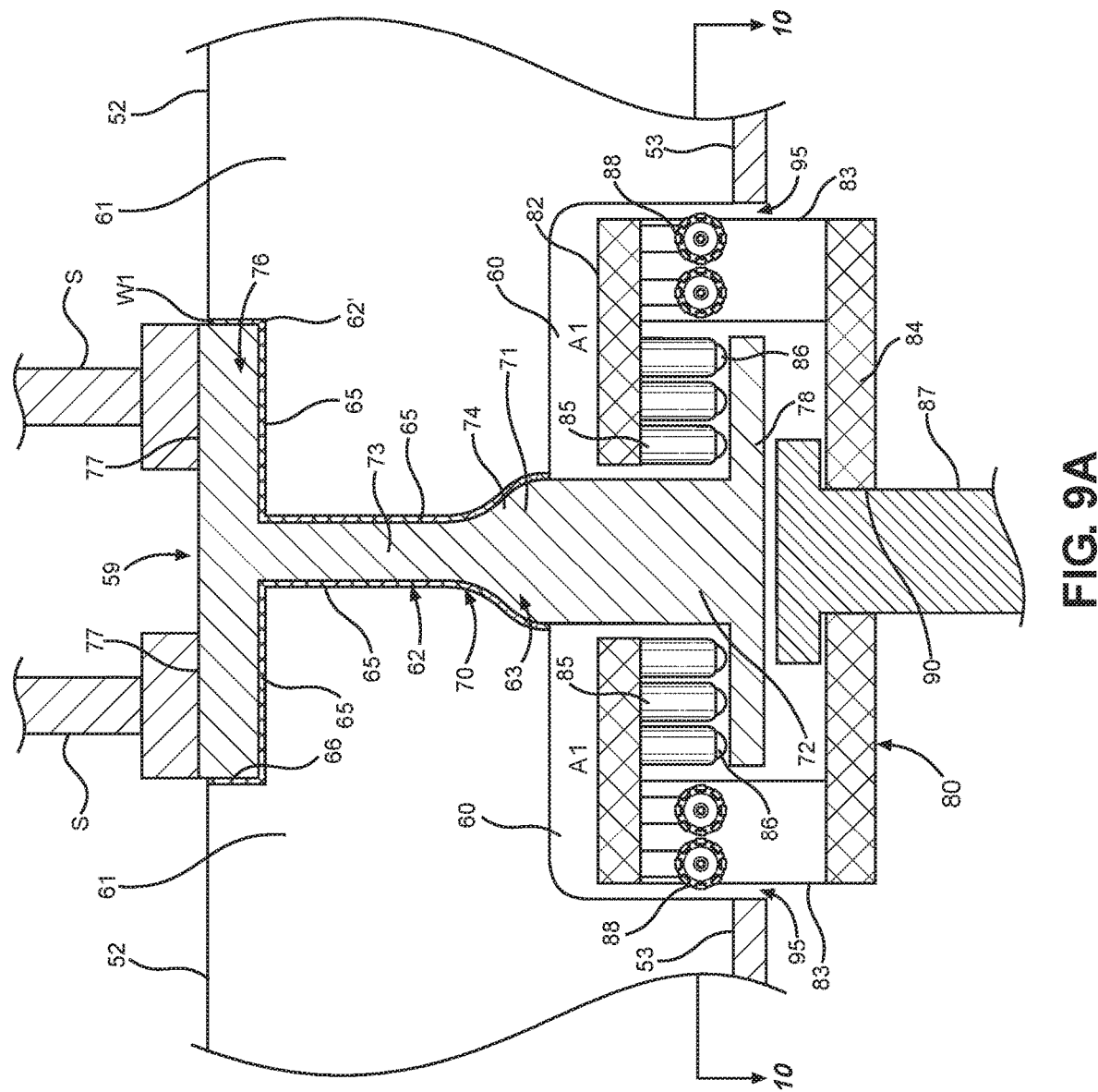
FIG. 9A is a cross sectional view showing the pedestal support of FIG. 8B welded between the webs of opposing inverted "T" beams of the grid track structure of the invention and showing a carriage having spherical rollers and bi-directional rollers for supporting a load transfer unit from the track structures at an intersection of the X and Y beams.

With reference to FIG. 9A, at each intersection 59 of the X-Y inverted "T" beams, two pair of open areas "A1" must be provided for passage of the carriages 80 that support the more conventional transfer units as discussed above and as described in the prior art. The carriage openings are created by aligning the cut out portions 60/60' of each beam 50/50' on opposite sides of each support pedestal 70.

Figure 8A:
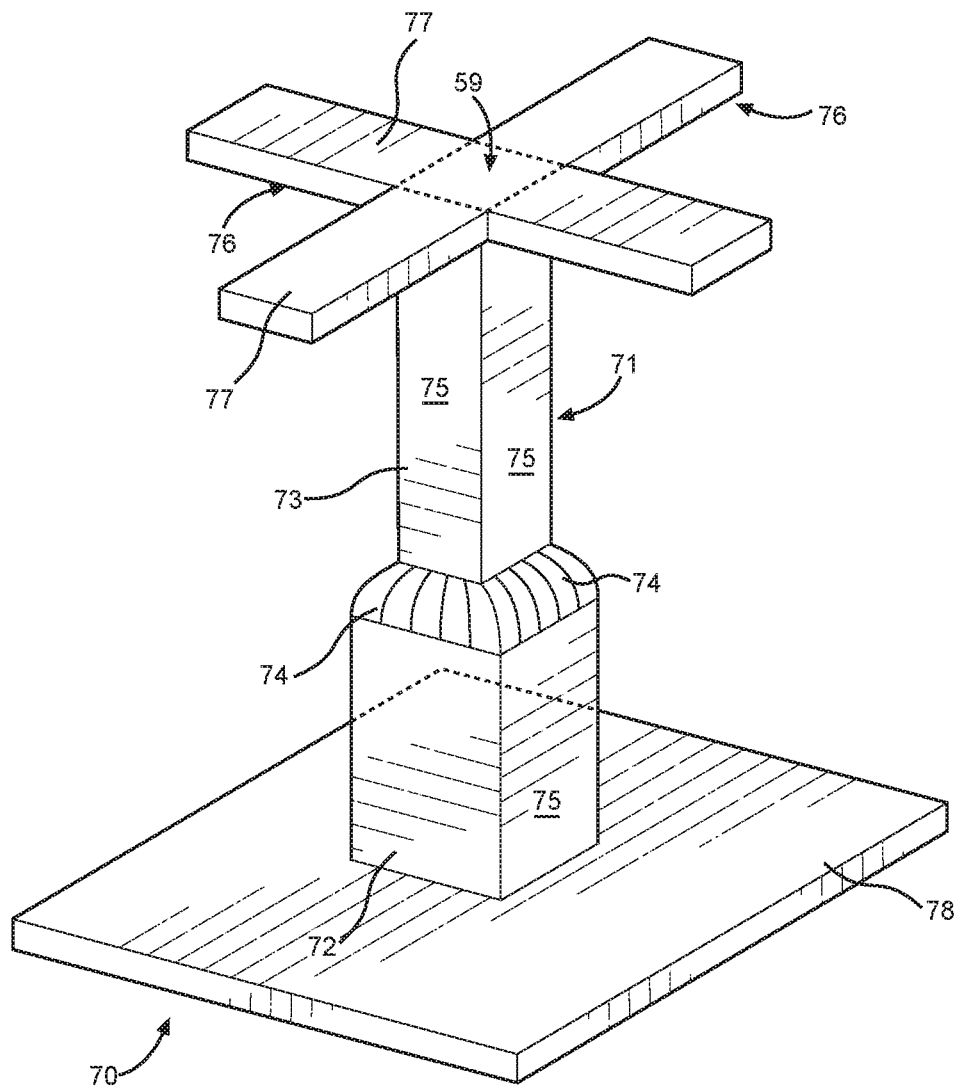
FIG. 8A is a perspective view of a pedestal support for connecting the ends of two pairs of oppositely oriented inverted "T" beams extending in perpendicular X and Y directions in order to create open intersections in an overhead grid track system using multiple connected X and Y inverted "T" beams in accordance with the teachings of the present invention and using the modified beam structures shown in FIGS. 6A-6D.
Figure 8B:
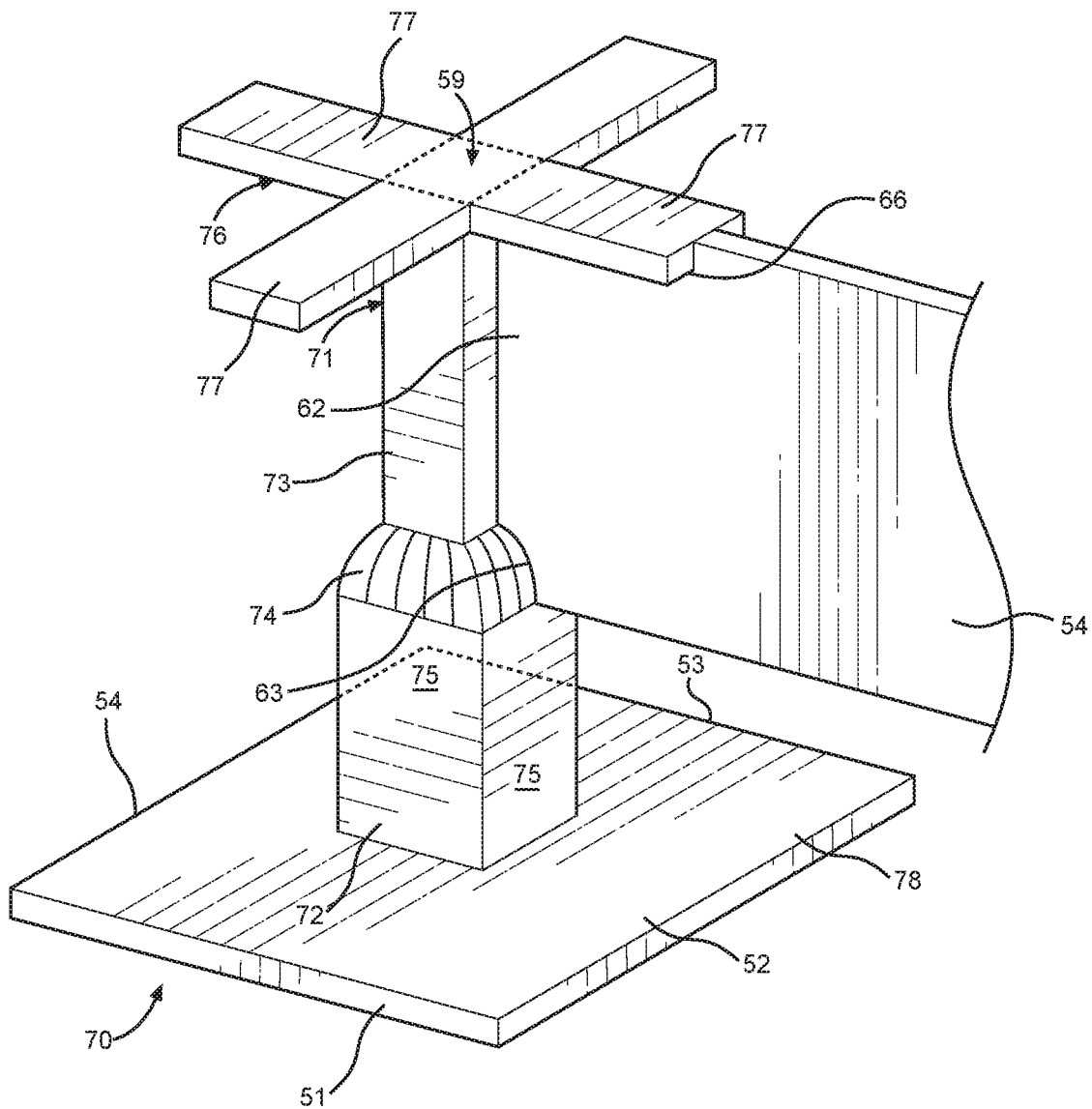
FIG. 8B is a perspective illustrational view similar to FIG. 8A showing the projecting end portion of the web of one of the inverted "T" beams of FIG. 6A or 6B mounted and secured to a support pedestal.
Figure 8C:
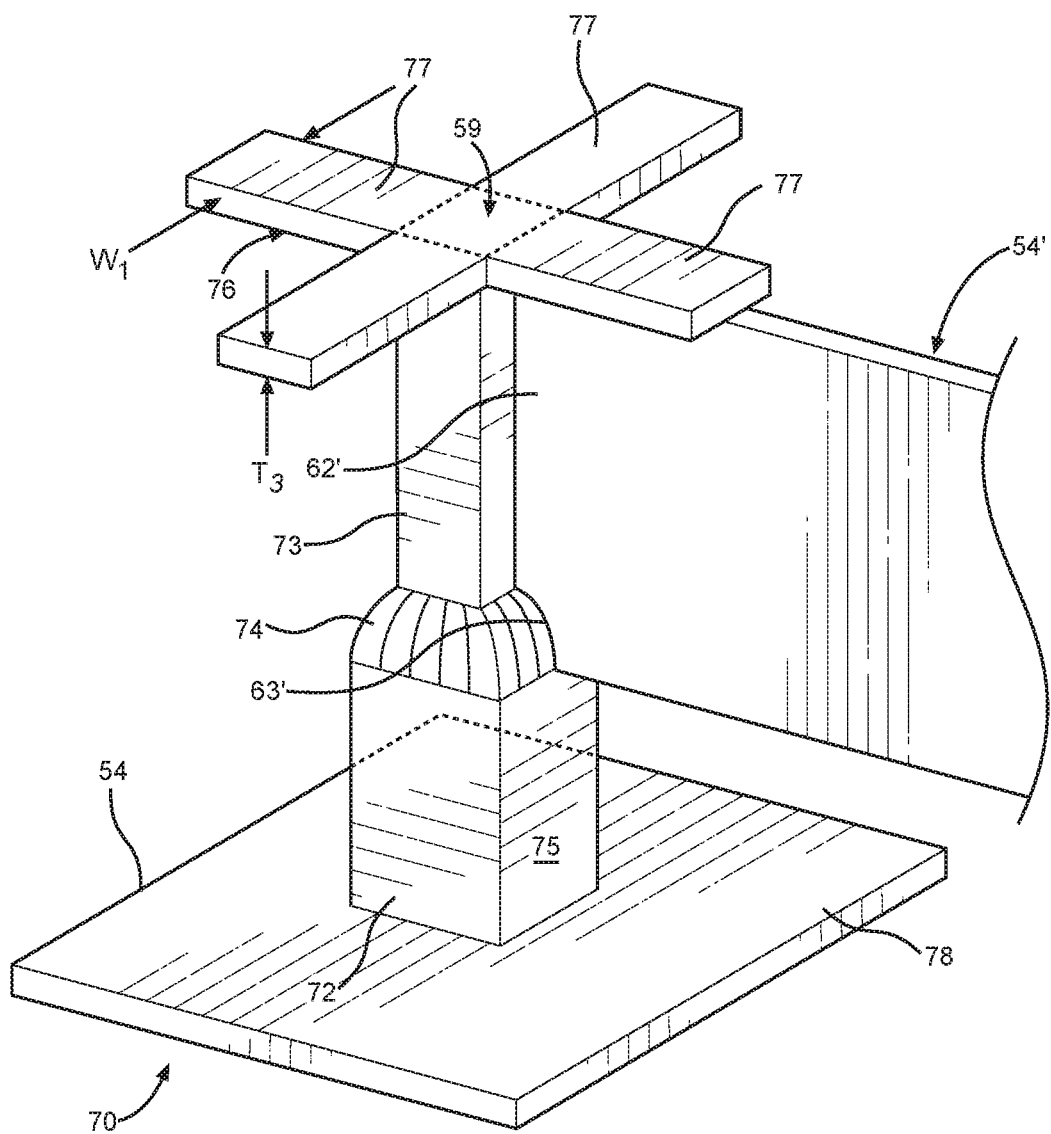
FIG. 8C is a perspective illustrational view similar to FIG. 8A showing the projecting end portion of the web of one of the inverted "T" beams of FIG. 6C or 6D mounted and secured to a support pedestal.

Each support pedestal 70 is shown in FIGS. 8A-8C as including a central vertically oriented body 71 which is generally enlarged and squared at a lower end 72 thereof and which is integrally formed with an upper end 73 of lesser cross sectional dimension and wherein, as previously described, outwardly arched or convex shoulders 74 are formed as transition areas along each of the four sides 75 of the pedestal. The curvature of the shoulders is provided to create complementary shaped seating surfaces to support the arcuate free ends or notches 63, 63', of the projecting portions 62, 62' of the central vertical webs 54, 54' of each of the four inverted "T" beams 50, 50' that are connected at each intersection 59 of the grid track system, see FIG. 9A.

Figure 9B:
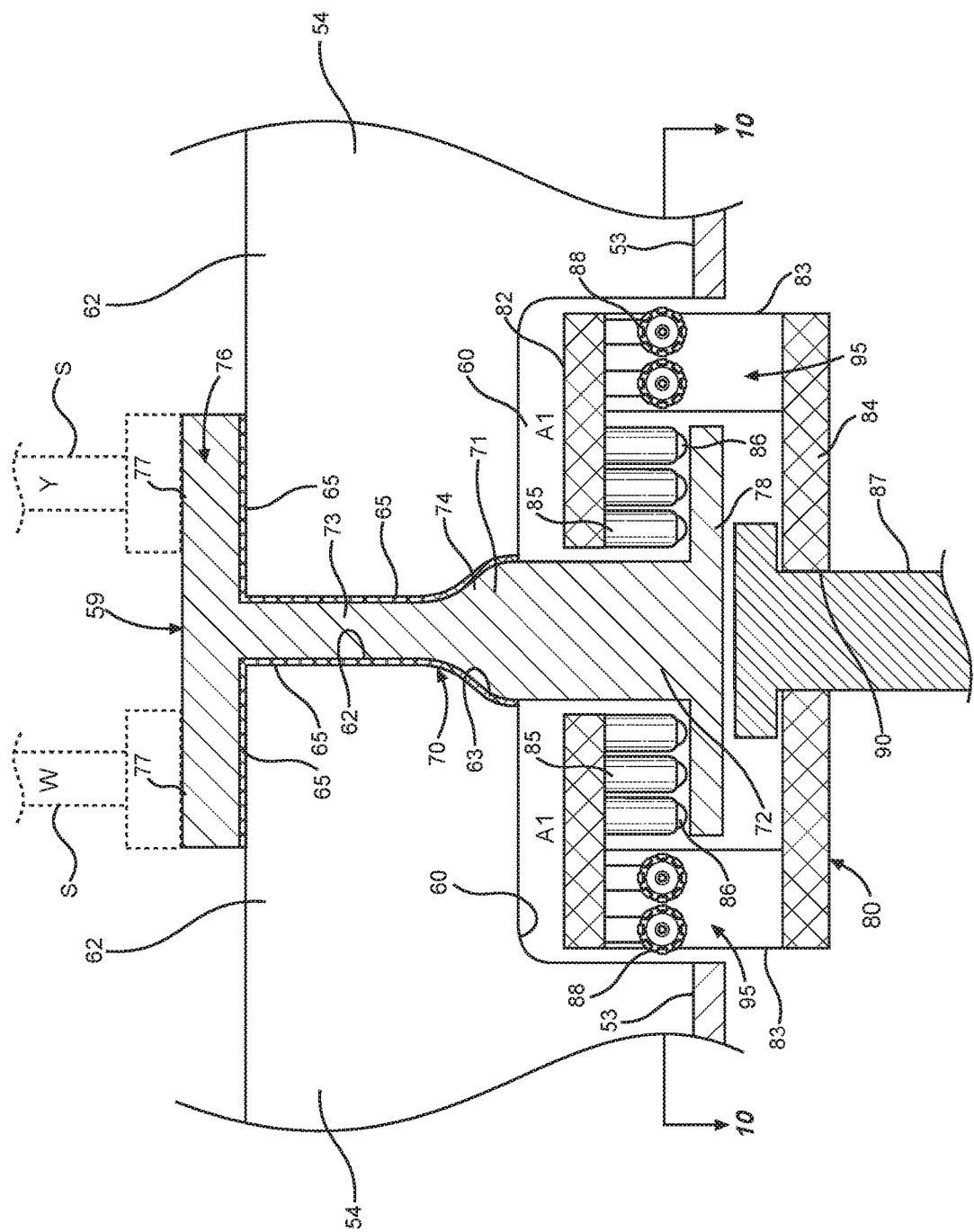
FIG. 9B is a cross sectional view showing the pedestal support of FIG. 8C welded between the webs of opposing inverted "T" beams of the grid track structure of the invention showing a carriage having spherical and bidirectional rollers for supporting a load transfer unit from the track structures at an intersection of the X and Y beams.

Each support pedestal 70 also includes an overhead steel mounting plate 76 that is formed having four outwardly extending arms 77, as shown in FIGS. 8A-8C, and wherein the arms are oriented in a generally perpendicular relationship which coincides with an orientation of a lower steel transfer plate 78 which is integrally formed or welded to a bottom of the lower portion 72 of the body 71 of each pedestal. Each lower transfer plate 78 is generally square having four sides and is of a dimension to fit within the open areas "A1" defined between the opposing projecting end portions of the lower flanges 53, 53' of each of the inverted "T" beams 50/50' to thereby create four spaced open passages 95 between the ends of the lower flanges of the X and Y oriented beams and the four sides of the transfer plate for passage of a support frame of the carriages 80, as will be described below. The upper steel plate 76 of each pedestal may be welded or integrally formed with the upper portion 73 of the body 71 of each pedestal 70. In FIGS. 9A and 9B, both the upper plate 76 and the lower transfer plate 78 are shown as being integrally formed with the body of the pedestal. It should be noted that the relative sizes, widths, and shapes of the elements of the pedestals may vary depending upon the load capacities intended to be placed upon the pedestals during use. Also, the vertical body 71 may be round or some other configuration in cross section so as to vary the manner in which forces and stress are distributed between the inverted "T" beams and the support pedestals during operation of a system in accordance with the teachings of the present invention. Also, the upper plate 76 may be formed in other shapes, such as a square, rectangle or round, as opposed to having the arms 77.

With continued reference to FIG. 8C, the overhead steel mounting plates 76 may have varying width dimensions "$W_1$" and thickness dimensions "$T_3$" depending upon the operational requirements of the systems during use. Thus the relative dimensions between the beam web and flange dimensions and the overhead mounting plate dimensions will be variable and within the teachings of the invention.

With reference to FIGS. 6A and 6B and 8B, in the embodiment of the invention wherein at least one projecting end portion 62 of the web 54 is notched as shown at 66 to create a cooperative seating surface for an arm 77 of the overhead mounting plate 76, the arms 77 of the mounting plate are seated within the notches 66 of the web 54 and the notches 63 at the projecting end portions of the webs 54 seated on the shoulders 74 of the pedestal 70, as shown in FIG. 9A. The notches 63 of the web 54 are welded on the shoulders 74 of the pedestal 70, the projecting end portions 62 welded to the upper end 73 of the pedestal and the arms 77 of the overhead mounting plate 76 are also welded, at lines 65, within the notches 66 of the projecting end portions 62 of the web 54 of the inverted "T" beam 50.

With reference to the embodiments of FIGS. 6C and 6D and as shown in FIGS. 8C and 9B, the upper surface of the projecting end portion 62' of the web 54' is not notched and the arms 77 of the overhead mounting plate 76 are mounted to the upper surface of the projecting end portion of the web 54' as shown. When the projecting end portion 62' of the beam 50' is secured to the pedestal 70, such as shown by the dark welding lines at 65, the notches 63' of the web 54' are seated and welded on the shoulders 74 of the pedestal 70. The arms 77 of the overhead mounting plate 76 are also welded at lines 65 to the upper edge of the projecting end portion 62' of the web 54' of the inverted "T" beam 50'.

Figure 11:
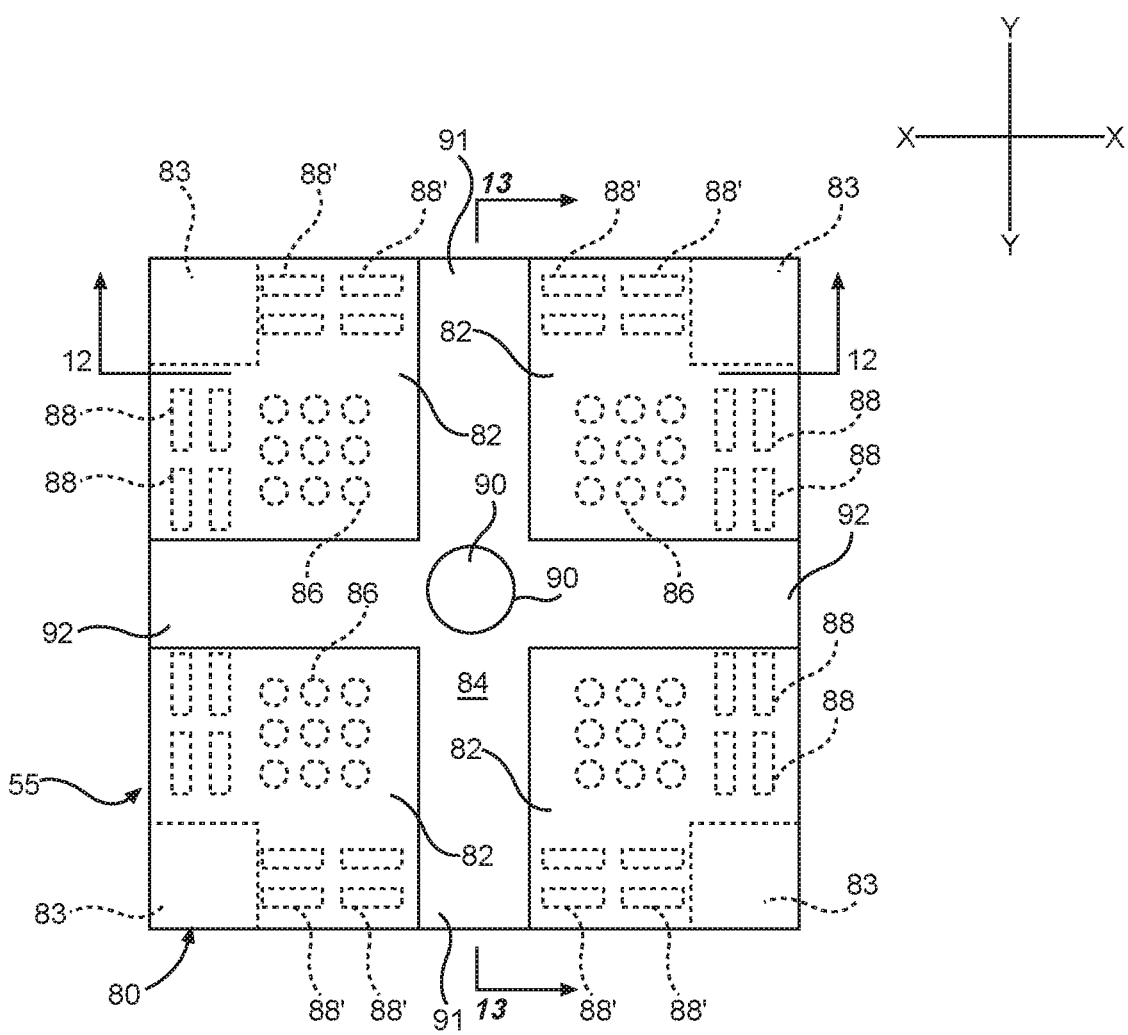
FIG. 11 is a top plan view of the carriage of FIG. 10 showing upper portions of the carriage.
Figure 12:
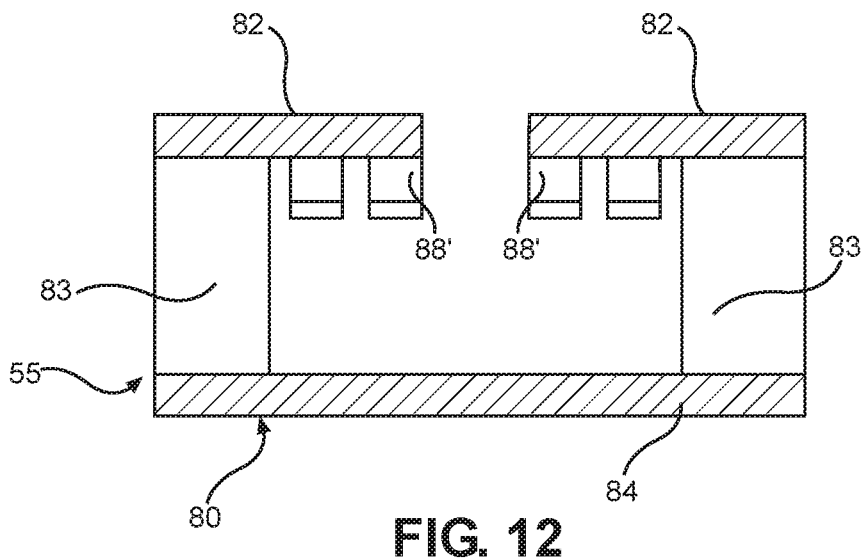
FIG. 12 is a side view of the carriage of FIG. 11 taken along line 12-12 of FIG. 11.
Figure 13:
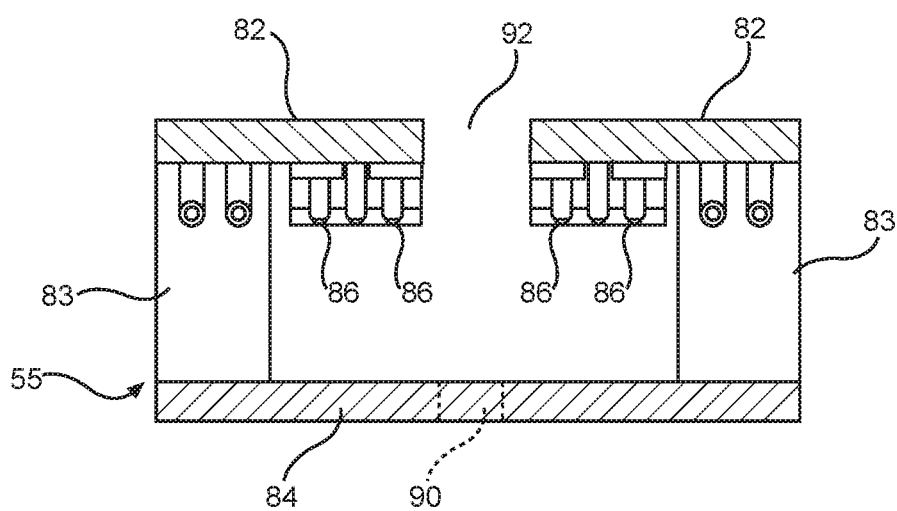
FIG. 13 is a cross sectional view taken along line 13-13 of FIG. 11.

With reference to FIGS. 9A-13, one of the carriages 80 for supporting one of the transfer units 30 and 40, or other similar transfer units, is shown in greater detail. FIG. 11 is a top plan view of the carriage 80 showing four spaced upper corner plates 82, shown in full lines, that are mounted and secured to four posts 83, see FIG. 12, that connect the upper corner plates to a generally solid base 84 having a central opening 90 therein for passage of a T-shaped pin 87, see FIGS. 9A and 9B, that connects the carriage 80 to a transfer unit. The frame of each carriage formed of the plates, posts and base are preferably formed of steel to provide for maximum support strength. Open channels 91 and 92, see FIG. 11, are formed between the four upper corner plates 82 that allow passage of the carriage about the support pedestals 70 as shown in FIGS. 10 and 11. As previously described, normally four carriages are used to support or suspend each transfer unit, such as 30 and 40, to two pairs of spaced and opposing inverted "T" beams 50.

Mounted to the bottom of each of the corner plates 82 are a plurality of sockets 85, see FIGS. 9A and 9B, in which spherical rollers 86 are carried for supporting the carriage 80 on the upper surfaces of the flanges 53 of each of the inverted "T" beams 50 and on the transfer plates 78 of the pedestals 70. In FIG. 10 and FIG. 11, nine spherical rollers 86 are mounted on each plate 82, however, the number may be varied. See for example, the embodiment of FIGS. 15 and 16, wherein only four spherical rollers 86 are used due to a rail structure added to each flange portion 53 of the inverted "T" beams, as will be described in greater detail. The spherical rollers are heavy industrial rollers capable of supporting significant weight as the carriages may be supporting tons of weight during use in a storage system. Also mounted to the lower surface of the plates 82 are sets of spaced elongated bi-directional rollers 88, 88'. With reference to FIG. 11, the bi-directional rollers 88 have their elongated axes oriented so that the rollers are used to support the carriage in an X whereas the bi-directional rollers 88' have their elongated axes oriented so as to support the carriages when moving in a Y direction as the carriage moves along the upper surfaces of the flanges 53 of the inverted "T" beams of the grid track system. Again, the number of directional rollers may be varied and remain within the teachings of the present invention.

As shown in FIGS. 9A and 9B, and 10-13, the sets of rollers 88, 88' used to support the carriage on the inverted "T" beams 50 pass through open spaces 95 formed between the transfer plates 78 of the support pedestals and the edges 53A of the spaced "T" beams as the carriage moves along the grid track system. The spherical rollers 86 and the directional rollers 88 are shown in dotted line in FIG. 11.

It should be noted that the inverted "T" beams 50' may be used in the same manner as shown in FIGS. 9A-11 as the inverted "T" beams 50.

Figure 14A:
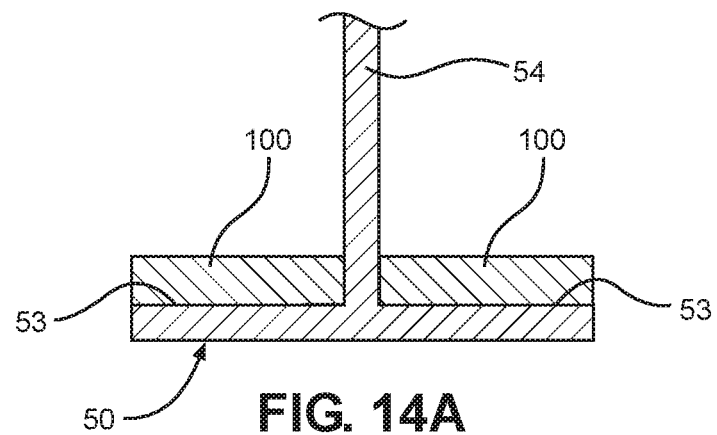
FIG. 14A is a partial cross sectional view, similar to FIGS. 7A and 7B, showing an addition of generally planar wear plates secured to upper surfaces of the two oppositely oriented flanges of one of the inverted "T" beams.
Figure 14B:
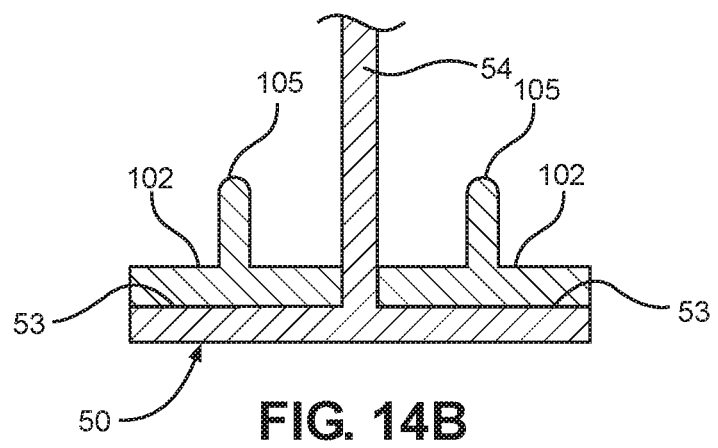
FIG. 14B is a partial cross sectional view, similar to FIGS. 7A and 7B, showing hardened, vertically oriented rails mounted to the upper surfaces of the two oppositely oriented flanges of one of the inverted "T" beams.

With reference to FIGS. 14A and 14B, two further embodiments of the invention are disclosed which are directed to modifications to reinforce the flanges 53 of the inverted "T" beams 50. Due to the weight of the carriages and loads carried by the carriages during use of the system of the present invention, it is advantageous to reinforce the flanges 53 of the "T" beams to compensate for wear and tear. In FIG. 14A, replaceable wear plates 100 are secured to the opposite flanges 53 along a portion or along the entire length of the overhead grid system. The plates 100 may be formed of steel or some other strong material that may be removably secured to the flanges. As the wear plates become worn or damaged they may be easily and readily replaced, such as by using bolts or the like. In this manner, the longevity of the inverted "T" beams may be extended. The wear plates also add additional strength to the track system and also extend the life of the inverted "T" beams 50. The same type of wear plates may also be used with the inverted "T" beams 50'.

Figure 15:
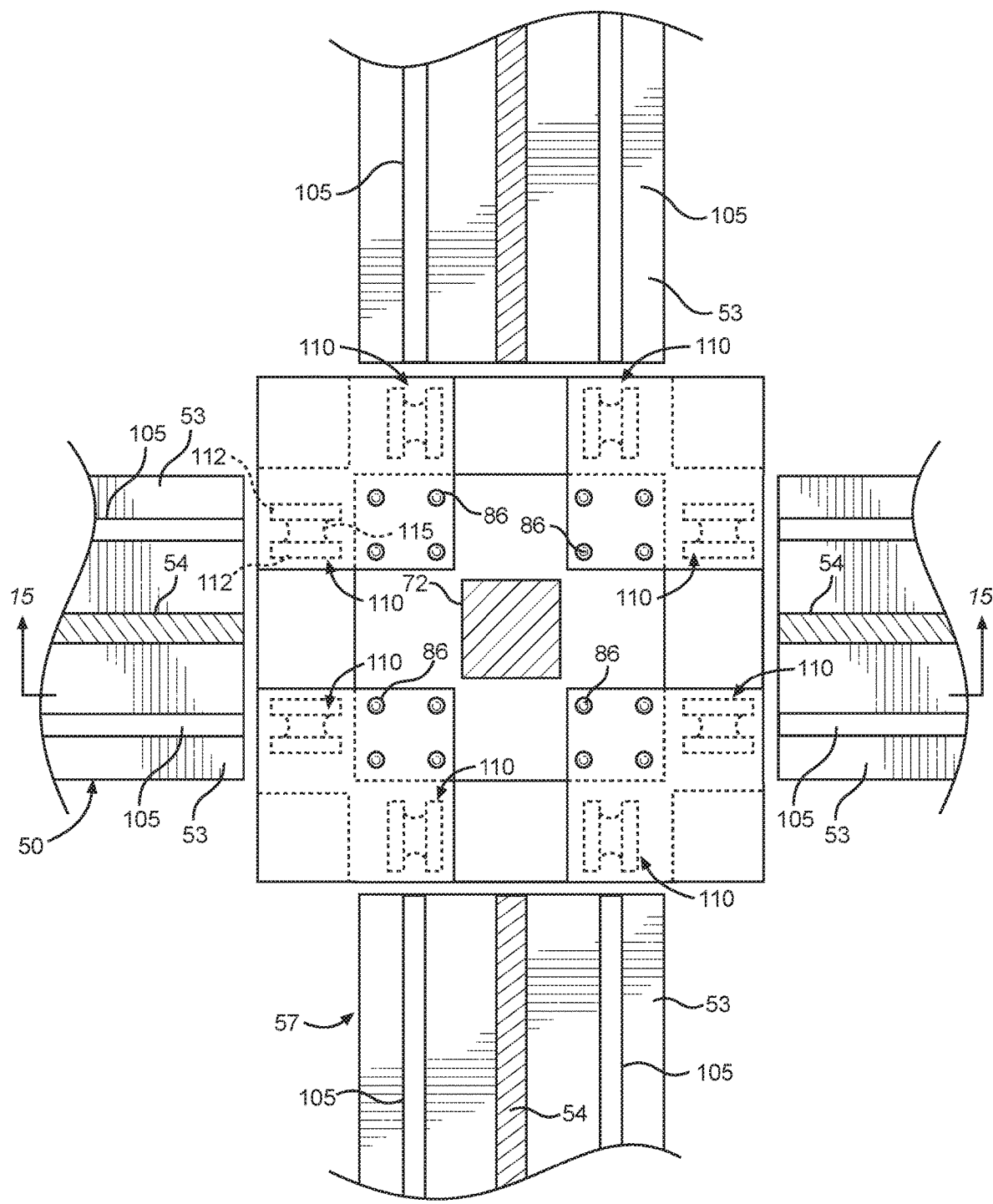
FIG. 15 is a cross section view similar to FIG. 10 showing spherical and bi-directional sheave type rollers for supporting the carriage of FIG. 16 on the hardened rails shown in FIG. 14B mounted to the upper surfaces of the horizontal flanges of the inverted "T" beam forming the overhead grid track structure of the invention.
Figure 16:
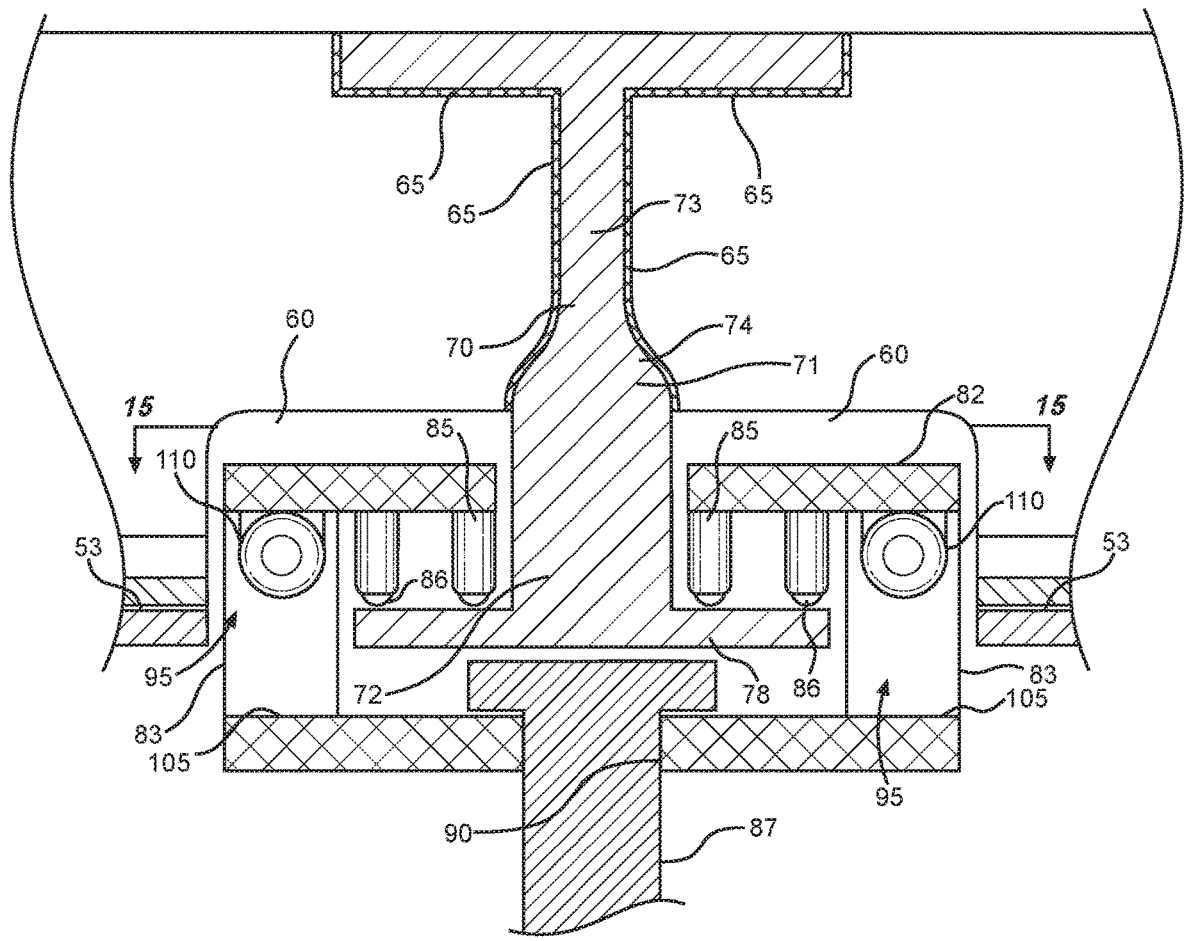
FIG. 16 is a view through cross section 15-15 of FIG. 15 showing the pedestal support of FIG. 8B welded between the webs of opposing inverted "T" beams of the grid track structure of the invention and showing a carriage having spherical rollers and bi-directional sheave rollers of FIG. 15 for supporting a load transfer unit from the track and rail structures at an intersection of the X and Y inverted "T" beams of the invention.

With reference to FIG. 14B, a further modified reinforcing and wear reduction improvement may be made by securing rail structures 102 to each of the opposite flanges 53 of the inverted "T" beams 50. The rails may be formed of the same material as the wear plates 100 or the structures may have plate members similar to 100 to which are mounted vertically extending rail members 105 that may be slightly curved or rounded at the upper end thereof. As with the prior embodiment, the additional rail structures not only reinforce the strength of the flanges 53 of the inverted "T" beams but also prolong the longevity of the flanges by compensating for wear and tear by being replaceable when they become worn. When using the embodiment of FIG. 14B, the carriages 80 must be modified as previously described to remove some of the supporting ball rollers 86 as shown in FIGS. 15 and 16. The same type of rail structures may also be used with the inverted "T" beams 50'.

When using the modified rail structures 102 and 105, the intermediate rows of ball rollers 86 must be removed from the carriages so as not to obstruct the passage of sheave rollers 110 that have annular flanges 112 on opposite sides of a center roller 115 that rolls on the upper surface of the rails 105. As shown in FIG. 15, two pair of sheave rollers 110 are provided on opposite sides of the carriages to support movement of the carriages in an X direction and two additional pair of sheave rollers are provided on opposite sides of the carriages to support movement of the carriages in a Y direction relative to the transfer plates 78 of the support pedestals of the overhead grid system. The remaining spherical rollers are shown at 86 in FIG. 15.

Figure 17A:
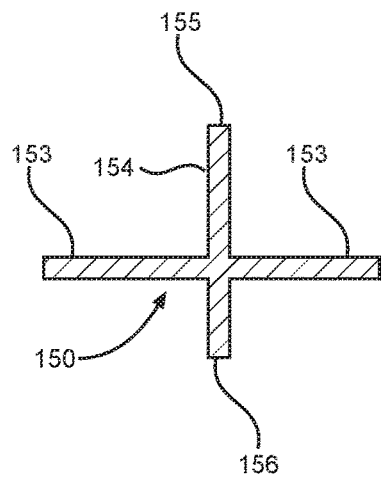
FIGS. 17A-17D show cross sectional views of additional embodiments of inverted "T" beams that may be used in keeping with the teachings of the present invention.

The invention further contemplates additional embodiments of inverted "T" beams to be used in accordance with the teachings of the invention. A first modified embodiment of inverted "T" beam 150 is shown in FIG. 17A wherein oppositely oriented flanges 153 are shown as being secured, such as by weld, bolting or being integrally formed with the vertical web 154 along portions of the web vertically spaced from both the upper edge 155 and lower edge 156 of the beam. Preferably, the flanges 153 are horizontally aligned with one another on opposite sides of the web.

Figure 17B:
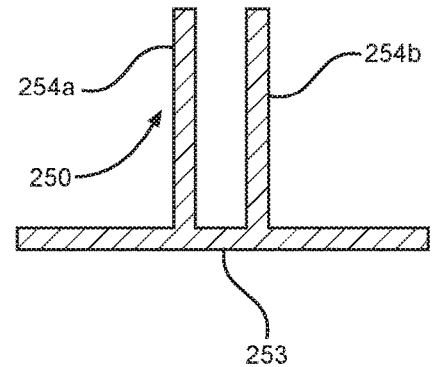
Figure 17C:
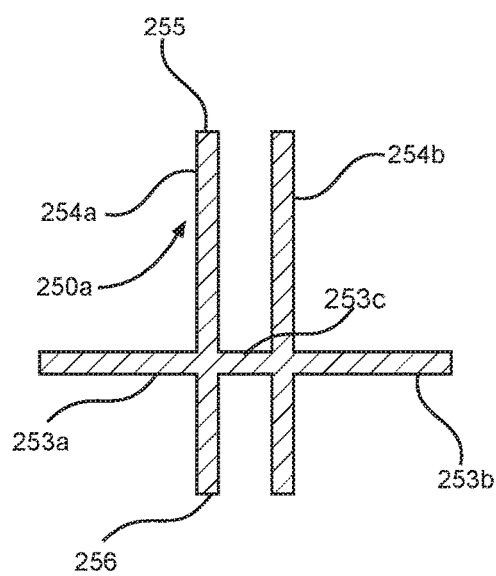

Another embodiment of inverted "T" beam 250 is shown in FIG. 17B as including two or more vertical webs 254A and 254B which are secured or formed with oppositely oriented flanges 253 that extend horizontally therefrom from the lower portions of the webs. A modification of the inverted "T" beam of FIG. 17B, 250A, is shown in FIG. 17C wherein oppositely oriented flanges 253A and 253B extend outwardly on opposite sides of the two vertical webs 254A and 254B intermediate the upper and lower edges 255 and 256 of the vertical webs. Again, the flanges are preferably horizontally aligned with one another. In this embodiment, a connector flange 253C may be welded or otherwise secured between the spaced vertical webs.

Figure 17D:
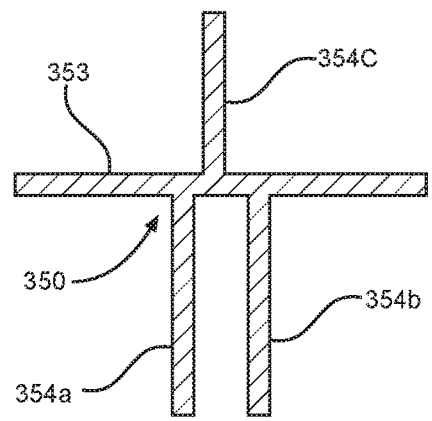

Yet another embodiment of inverted "T" beam 350 is shown in FIG. 17D wherein the beam includes a pair of lower vertical webs 354A and 354B from which oppositely oriented flanges 353 extend from opposite sides of the pair of webs. Another vertical web 354C is welded or otherwise secured to extend upward from the oppositely oriented flanges.

Figure 18:
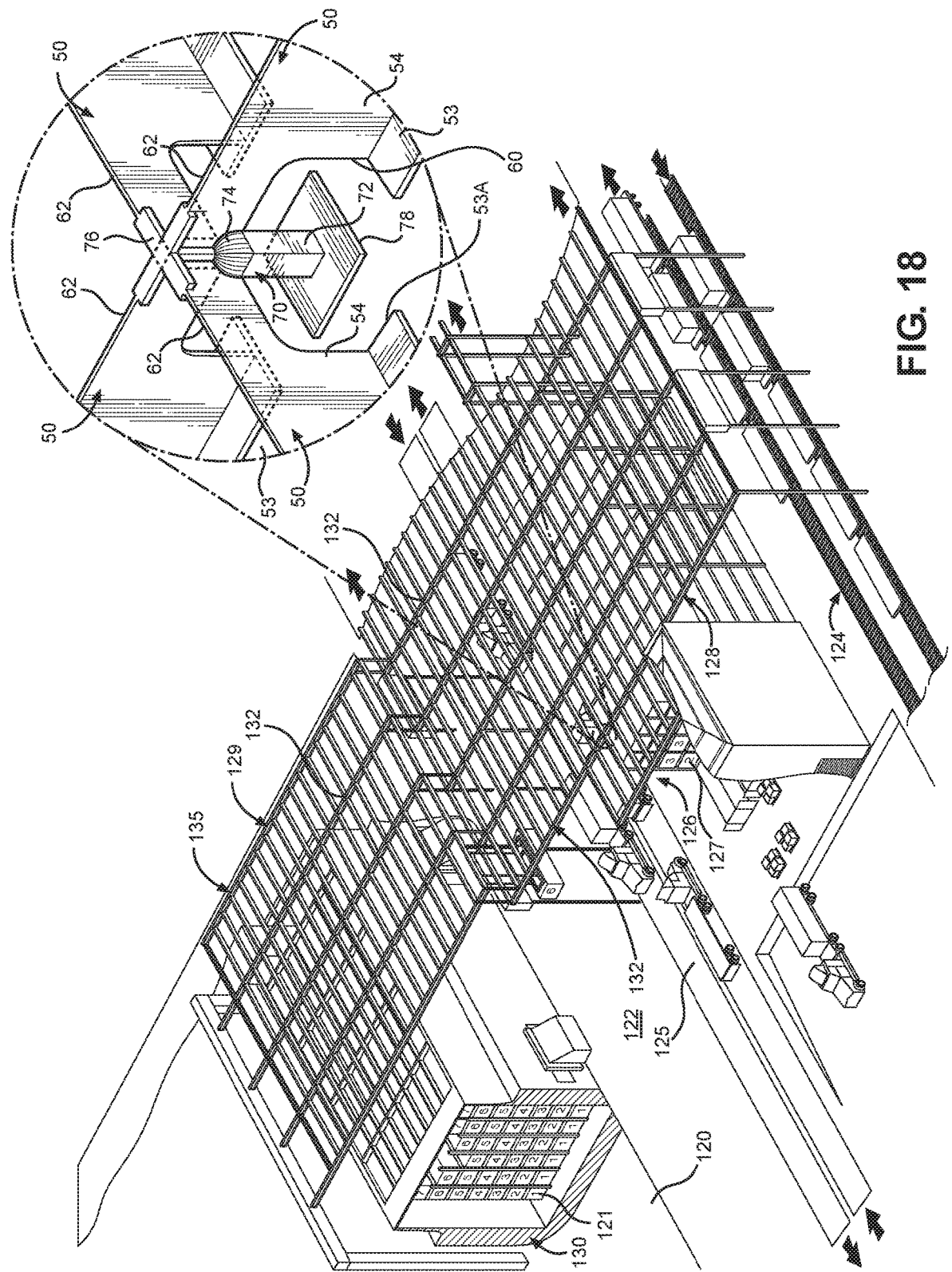
FIG. 18 is a top perspective view of a two tier overhead grid track system using the inverted "T" beams and support pedestals of the present invention illustrated above a ship docking area and extending therefrom over truck loading and unloading area, a storage warehouse having vertically stacked storage cells and a railway loading and unloading area wherein the view includes a break out portion showing a typical intersection of the grid track system of the invention.

FIG. 18 is a top perspective view of a port terminal storage and distribution system similar to what is disclosed in U.S. Pat. No. 7,753,637, to Benedict et al, which has been modified to incorporate the inverted "T" beams of the present invention in the structure of the separate levels of an overhead grid track system. The port system includes one or more ship docking berths 120 in which cargo and other container transport ships may be docked for loading and unloading of cargo, such as shipping containers 121. Dock structures 122 extend along the berths and support vertically elevated cargo transfer platforms 123. The port storage and distribution system also includes a railway cargo transfer loading and unloading area 124, a vehicle or truck cargo transfer loading and unloading area 125 and an open or enclosed warehouse storage area 126. The warehouse storage area includes a plurality of vertically aligned storage cells 127 that may be either vertically or horizontally accessed for transferring and/or storage of goods and other cargo.

The port container terminal storage and distribution system includes two overhead grid track systems for use by transfer units or vehicles as discussed herein, and within the prior art, but wherein the overhead grid tracks are formed using the inverted "T" beams of the present invention. A first grid track system 128 is elevated above the storage area 126, the truck transfer area 125 and the railway transfer area 124 and also extends outwardly over one or more cargo transfer platforms 123. A second grid track system 129 extends above a height of the first system 128 and over the ship docking berth 120 so as to be elevated over the storage deck and/or hold of a ship 130 and also over the one or more transfer platforms 123.

The enlargement of FIG. 18, shows a typical intersection of both of the first and second grid track systems 128 and 129 wherein the grid track system of the present invention using inverted "T" beams and support pedestals is shown. Each pedestal 70 has an upper mounting plate 76, which may be of varying configuration, as previously described. Each mounting plate is designed to be secured by welding, bolting or the like to an overhead support structure 132 of a building or other elevated structure 135 which may be steel beams, such as used in flat roof structures, or roof trusses and the like which are secured in an X-Y generally perpendicular relationship to one another. In some structures, a roof, not shown, may be provided over the overhead support structure 132. With the invention, the pedestals 70 are secured to depend from the support structure 132. Thereafter, the inverted "T" beams 50, 50' are welded or otherwise secured at each projecting end 62, 62' thereof between two spaced pedestals 70. The notched ends 63, 63' of the protruding ends 62, 62' or the vertical webs 54, 54' of the inverted "T" beams rest upon the shoulder portions 74 of the pedestals above the transfer bases or plates 78 of the pedestals and are thus rigidly joined to the building support structure 132. At each intersection of the grid track systems, the pedestals insure that all carriage support flanges of the inverted "T" beams are horizontally aligned. In addition, the transfer plates 78 associated with each pedestal will be aligned with the flanges of the inverted "T" beams so that the carriages associated with the transfer units or vehicles will smoothly transition from one inverted "T" beam to another across the transfer plates at each intersection of the grid track system.

Figure 19:
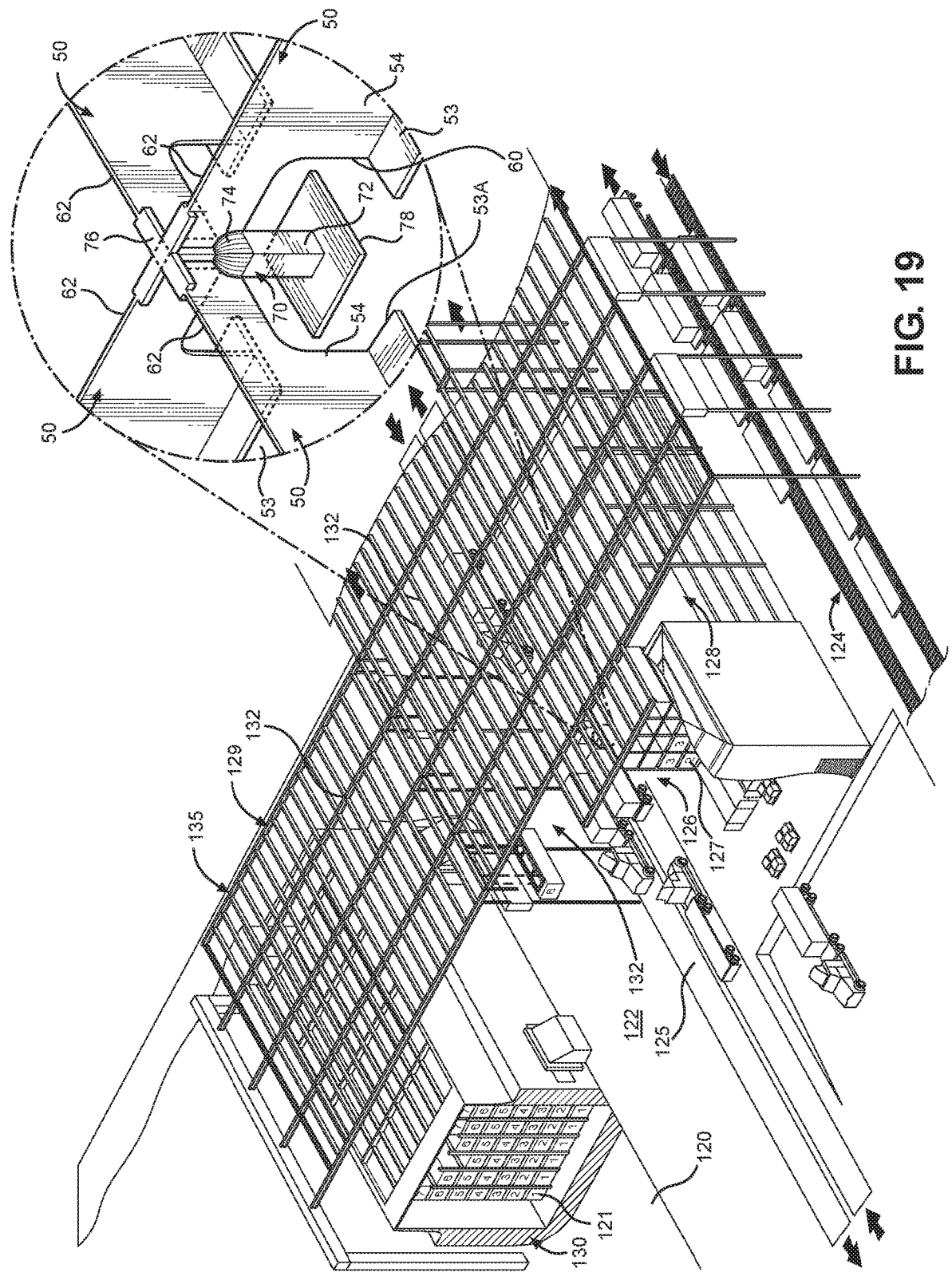
FIG. 19 is a top perspective view of a single tier overhead grid track system using the inverted "T" beams and support pedestals of the present invention illustrated above a ship docking area and extending therefrom over a truck loading and unloading area, a storage warehouse having vertically stacked storage cells and a railway loading and unloading area wherein the view includes a break out portion showing a typical intersection of the grid track system of the invention. In this embodiment of the invention wherein the elevated transfer platform is not used but rather the grid track system of the invention is over the berth area for a container ship so that the overhead container transfer vehicles or units of the invention are used to both load and off load containers relative to a container ship as well as to move containers to and from land carriers such as railway cars and trucks.

FIG. 19 is a top perspective view of yet another port terminal storage and distribution system similar to what is disclosed in U.S. Pat. No. 7,753,637, to Benedict et al, which has been modified to incorporate the inverted "T" beams of the present invention in the structure for a single level overhead grid track system for transferring containers directly from the ship to the storage queue, truck transfer area and the rail transfer area.

The port container terminal storage and distribution system in FIG. 19 includes a continuous overhead grid track system 160 for use by transfer units or vehicles as discussed herein, and within the prior art, but wherein the overhead grid tracks are formed using the inverted "T" beams of the present invention. The grid track system 160 is elevated above both the storage area 126, the railway transfer area 124, the truck transfer area 125 and also extends outwardly over the ship docking berth 120 so as to be elevated over the storage deck and/or hold of a ship 130.

The enlargement of FIG. 19, shows a typical intersection of the grid track systems 150 wherein the grid track system of the present invention using inverted "T" beams and support pedestals is shown. Each pedestal 70 has an upper mounting plate 76, which may be of varying configuration, as previously described. Each mounting plate is designed to be secured by welding, bolting or the like to an overhead support structure 132 of a building or other elevated structure 135 which may be steel beams, such as used in flat roof structures, or roof trusses and the like which are secured in an X-Y generally perpendicular relationship to one another. In some structures, a roof, not shown, may be provided over the overhead support structure 132. With the invention, the pedestals 70 are secured to depend from the support structure 132. Thereafter, the inverted "T" beams 50, 50' are welded or otherwise secured at each projecting end 62, 62' thereof between two spaced pedestals 70. The notched ends 63, 63' of the protruding ends 62, 62' or the vertical webs 54, 54' of the inverted "T" beams rest upon the shoulder portions 74 of the pedestals above the transfer bases or plates 78 of the pedestals and are thus rigidly joined to the building support structure 132. At each intersection of the grid track systems, the pedestals insure that all carriage support flanges of the inverted "T" beams are horizontally aligned. In addition, the transfer plates 78 associated with each pedestal will be aligned with the flanges of the inverted "T" beams so that the carriages associated with the transfer units or vehicles will smoothly transition from one inverted "T" beam to another across the transfer plates at each intersection of the grid track system.

In the port container terminal storage and distribution system in FIG. 19 the transfer units or vehicles travel directly from the ship 130 to the storage 126, vehicle or truck cargo 125 and railway 124 transfer areas therefore, eliminating the need for transfer platforms 123.

From the foregoing, the grid track system of the present invention uses the inverted steel "T" beams to form the overhead track structures without loss of strength and in such a manner that inspection and maintenance of the track system and transfer units or vehicles traveling along the track system is dramatically enhanced over prior art overhead box beam systems. With the invention, the inverted "T" beams are assembled to create generally perpendicular intersections of X-Y directional rails or tracks in such a manner that the intersections are reinforced by central pedestals 70 by welding or otherwise attaching of the oppositely oriented horizontal webs to the pedestals and overhead mounting plates of the pedestals as shown in FIGS. 9A and 9B. FIGS. 9A and 9B also exemplify how the carriages for supporting transfer units on the grid track system of the invention may pass by the centralized reinforcing support pedestals. The use of the grid track system of the present invention can significantly reduce costs of initial installation and prolong the systems usefulness by reducing maintenance and upkeep costs.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

I claim:

1. An overhead guide track system for automated material handling and storage facilities wherein at least one transfer unit is suspended from carriages that travel along the track system so that the at least one transfer unit moves objects to and from vertically oriented storage areas, the track system comprising, a plurality of first and second inverted "T" beams assembled in an X-Y manner such that the first and second inverted "T" beams intersect with one another in generally perpendicular relationship at a plurality of intersections and wherein each of the first and second inverted "T" beams includes at least one vertical web from which horizontal flanges extend outwardly on opposite sides of the at least one vertical web whereby the carriages are supported on upper surfaces of the horizontal flanges of each of the plurality of first and second inverted "T" beams, each of the first and second inverted "T" beams having opposite ends, a vertically oriented support pedestal provided at each of the plurality of intersections, at least one of the opposite ends of a plurality of the first and second inverted "T" beams being connected to the support pedestals at the plurality of intersections in such a manner as to provide clearance space between the opposing ends of the first and second inverted "T" beams and the support pedestals of a size to permit portions of the carriages to pass there between as the at least one transfer unit moves along the track system.

2. The overhead guide track system for automated material handling and storage facilities of claim 1 wherein the horizontal flanges are coplanar and spaced from an upper surface of the at least one vertical web.

3. The overhead guide track system for automated material handling and storage facilities of claim 1 wherein each of the horizontal flanges of the first and second inverted "T" beams include a vertically upward extending rail extending along a length of the flanges for purposes of supporting rollers associated with the carriages of the at least one transfer unit.

4. The overhead guide track system for automated material handling and storage facilities of claim 1 wherein each of the horizontal flanges of the first and second inverted "T" beams include wear plates which are mounted along the upper surface of the flanges.

5. The overhead guide track system for automated material handling and storage facilities of claim 1 wherein the at least one vertical web of at least one of the opposite ends of a plurality of the first and second inverted "T" beams includes an extended portion which extends outwardly beyond the horizontal flanges in a direction along a longitudinal axis of the first and second "T" beams.

6. The overhead guide track system for automated material handling and storage facilities of claim 5 wherein the extended portions of the vertical webs include a contoured surface for cooperatively seating upon a complementary surface of a pedestal.

7. The overhead guide track system for automated material handling and storage facilities of claim 6 wherein each pedestal includes a vertical body having the complementary surface formed thereon, and an upper plate for mounting between extended portions of the vertical webs of each pair of opposing first and second inverted "T" beams to be connected to a common pedestal.

8. The overhead guide track system for automated material handling and storage facilities of claim 7 wherein the upper plate is formed having portions extending outwardly of the pedestal in X-Y directions which engage the central vertical webs.

9. The overhead guide track system for automated material handling and storage facilities of claim 8 wherein the upper plate of each pedestal is seated within an upper notch formed in the extended portions of each of the central vertical webs.

10. The overhead guide track system for automated material handling and storage facilities of claim 7 wherein the contoured surface of the extended end portions of the central vertical web are concavely shaped to engage the complementary surface of the pedestals which are convexly shaped.

11. The overhead guide track system for automated material handling and storage facilities of claim 1 wherein a lower transfer plate is connected to a lower portion of a vertical body of each pedestal and which lower transfer plate extends toward the edges of the adjacent horizontal flanges of the first and second inverted "T" beams and being of a size to be spaced therefrom to form the clearance spaces for passage of the portions of the carriages there through.

12. The overhead guide track system for automated material handling and storage facilities of claim 11 wherein a lower transfer plate is connected to a lower portion of a vertical body of each pedestal and which lower transfer plate extends toward the edges of the adjacent horizontal flanges of the first and second inverted "T" beams and being of a size to be spaced therefrom to form the clearance spaces for passage of the portions of the carriages there through.

13. The overhead guide track system for automated material handling and storage facilities of claim 1 wherein the at least one vertical web at both of the opposite ends of a plurality of the first and second inverted "T" beams include extended portions which extend outwardly beyond the horizontal flanges in a direction along a longitudinal axis of the first and second "T" beams.

14. The overhead guide track system for automated material handling and storage facilities of claim 13 wherein the extended portions of the vertical webs include a contoured surface for cooperatively seating upon a complementary surface of a pedestal.

15. The overhead guide track system for automated material handling and storage facilities of claim 14 wherein each pedestal includes a vertical body having the complementary surface formed thereon, and an upper plate for mounting between extended portions of the vertical webs of each pair of opposing first and second inverted "T" beams to be connected to a common pedestal.

16. A support carriage for supporting a transfer unit in an overhead guide track system for automated material handling, the support carriage comprising four spaced upper corner plates and four posts, wherein each of the four spaced upper corner plates are mounted on a separate post; a base supporting each of the four posts and mounted upper corner plates, each of the four posts mounted in a separate corner of the base, the base further having a central opening therein for passage of a T-shaped pin connectable to the transfer unit, the four spaced upper corner plates defining a first open channel and a second open channel, wherein the first open channel is bisected by the second open channel thereby allowing passage of the support carriage about a pedestal in an X-Y manner, and a set of spherical ball rollers and a set of bi-directional rollers mounted on a bottom surface of each of the four spaced upper corner plates.

17. The support carriage of claim 16, wherein each set of bi-directional rollers further comprise a first set of at least one bi-directional roller and a second set of at least one bi-directional roller, wherein the first set of at least one bi-directional roller is oriented perpendicularly relative to the second set of at least one bi-directional roller.

18. The support carriage of claim 16, wherein each set of spherical ball rollers further comprises nine spherical ball rollers.

19. The support carriage of claim 16, wherein each set of spherical ball rollers further comprises four spherical ball rollers.

20. The support carriage of claim 16, wherein each set of bi-directional rollers include sheave rollers.

21. The support carriage of claim 16, wherein each set of spherical ball rollers and each set of bi-directional rollers engage a plurality of first and second "T" beams oriented in an X-Y manner to allow the support carriage to travel along upper surfaces of flanges of each of the plurality of first and second "T" beams oriented in an X-Y manner.

22. The support carriage of claim 21, wherein each set of bi-directional rollers further comprise a first set of at least one bi-directional roller and a second set of at least one bi-directional roller, wherein the first set of at least one bi-directional roller is oriented perpendicularly relative to the second set of at least one bi-directional roller.

23. The support carriage of claim 22, wherein each of the first set of at least one bi-directional roller engages the upper surfaces of flanges of the plurality of first "T" beams oriented in an X manner while the support carriage travels in an X direction, and wherein each of the second set of at least one bi-directional roller engages the upper surfaces of flanges of the plurality of second "T" beams oriented in the Y manner while the support carriage travels in a Y direction.

24. The support carriage of claim 21, wherein each set of spherical ball rollers further comprises nine spherical ball rollers.

25. The support carriage of claim 21, wherein each set of spherical ball rollers further comprises four spherical ball rollers.

26. The support carriage of claim 21, wherein each set of bi-directional rollers include sheave rollers.

27. The support carriage of claim 21, wherein each set of nine spherical ball rollers engage the upper surfaces of flanges of each of the plurality of first and second "T" beams oriented in an X-Y manner when the support carriage travels in an X direction and when the support carriage travels in a Y direction.

* * * * *